(12) United States Patent
Lyle

(10) Patent No.: US 7,242,766 B1
(45) Date of Patent: Jul. 10, 2007

(54) METHOD AND SYSTEM FOR ENCRYPTING AND DECRYPTING DATA USING AN EXTERNAL AGENT

(75) Inventor: James D. Lyle, Santa Clara, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 858 days.

(21) Appl. No.: 09/991,057

(22) Filed: Nov. 21, 2001

(51) Int. Cl.
*H04K 1/00* (2006.01)

(52) U.S. Cl. .......................................... 380/2

(58) Field of Classification Search ............... 713/171
See application file for complete search history.

(56) References Cited

U.S. PATENT DOCUMENTS

| | | | | |
|---|---|---|---|---|
| 5,805,706 | A | * | 9/1998 | Davis ........................... 713/153 |
| 2003/0005285 | A1 | * | 1/2003 | Graunke ..................... 713/153 |

OTHER PUBLICATIONS

Pfleeger (Charles P. Pfleeger, "Security in computing", 2nd edition, 1996, ISBN: 0133374866), p. 101, 131-132, 140-141, 262, 386-387, 389, 406.*
Menezes et al. (Alfred J. Menezes, Paul C. van Oorschot, Scott A. Vanstone, "Handbook of applied cryptography", 1997, ISBN: 0849385237), p. 400-401.*
Stallings (William Stallings, "Data and computer communications", 5th edition, 1997, ISBN: 0024154253), Fig. 1.2 p. 6.*
Pfleeger (Charles P. Pfleeger, "Security in computing", 2nd edition, 1996, ISBN: 0133374866), p. 101, 113, 131-134, 386-387, 389, 406.*

(Continued)

*Primary Examiner*—Kambiz Zand
*Assistant Examiner*—Peter Poltorak
(74) *Attorney, Agent, or Firm*—Girard & Equitz LLP

(57) ABSTRACT

A communication system including a transmitter, a receiver, a communication link (for example, a TMDS-like link), and preferably also an external agent with which the transmitter and receiver can communicate, in which video data (or other data) are encrypted, the encrypted data are transmitted from the transmitter to the receiver, and the transmitted data are decrypted in the receiver, a transmitter and a receiver for use in such a system, a cipher engine for use in such a transmitter or receiver, a method for operating such a transmitter or receiver to encrypt or decrypt data, and a method for distributing keys to the transmitter and receiver. The receiver can be a player coupled to a downstream receiver by a TMDS-like link, and configured to re-encrypt the decrypted data (for example, using an AES or HDCP protocol) and send re-encrypted data over the link to the receiver. Optionally, the player is a repeater which translates the decrypted data from the transmitter, and then re-encrypts the translated data for transmission to the downstream receiver. The transmitter can itself be a player that receives and decrypts encrypted data from an upstream source. In preferred embodiments, the system implements a content protection protocol including a challenge-response procedure. After a new key is supplied to the receiver (and the same new key should have been supplied to the transmitter) and before the receiver can use the new key, the challenge-response procedure requires that the receiver validate the transmitter by verifying that the transmitter has proper knowledge of the new key.

6 Claims, 9 Drawing Sheets

OTHER PUBLICATIONS

Menezes (Alfred J. Menezes, Paul C. van Oorschot, Scott A. Vanstone, "Handbook of applied cryptography", 1997, ISBN: 0849385237), p. 400-402.*

NIST (Nechvatal et al., Report on the Development of the Advanced Encryption Standard (AES), Computer Security Division Information Technology Laboratory National Institute of Standards and Technology Technology Administration U.S. Department of Commerce, Publication Date: Oct. 2, 2000), http://csrc.nist.gov/CryptoToolkit/aes/round2/r2.*

*High-Bandwidth Digital Content Protection System*, Revision 1.0, by Intel Corporation, Feb. 17, 2000, pp. 1-60.

*High-Bandwith Digital Content Protection System Revision 1.0 Erratum*, by Intel Corporation, Mar. 19, 2001, pp. 1-9.

*Upstream Link for High-bandwidth Digital Content Protection*, Revision 1.00, by Intel Corporation, Jan, 26, 2001, pp. 1-38.

National Institute of Standards and Technology, Draft FIPS for the AES, 48 pages, downloaded from the Internet (from http://csrc.nist.gov/encryption/aes) on Sep. 18, 2001.

* cited by examiner

| INPUT | B0 | B1 | B2 | B3 | B4 | B5 | B6 | B7 | K0 | K1 | K2 | K3 | K4 | K5 | K6 | K7 |
|---|---|---|---|---|---|---|---|---|---|---|---|---|---|---|---|---|
| ORIGIN | Bz | Bz | Bz | Bz | Bz | Bz | Bz | By | Kz | Kz | Kz | Kz | Kz | Kz | Kz | Ky |
| OUTPUT BIT | | | | | | | | | | | | | | | | |
| 0 | 17 | 26 | 22 | 27 | 21 | 18 | 2 | 5 | 3 | 6 | 0 | 9 | 4 | 22 | 5 | 10 |
| 1 | 5 | 20 | 15 | 24 | 2 | 25 | 0 | 16 | 20 | 18 | 7 | 23 | 15 | 5 | 3 | 25 |
| 2 | 22 | 5 | 14 | 16 | 25 | 17 | 20 | 11 | 7 | 19 | 2 | 10 | 22 | 4 | 13 | 21 |
| 3 | 19 | 3 | 15 | 11 | 21 | 16 | 27 | 1 | 6 | 14 | 9 | 8 | 17 | 18 | 12 | 24 |
| 4 | 19 | 6 | 17 | 18 | 22 | 7 | 9 | 12 | 25 | 6 | 5 | 2 | 10 | 15 | 21 | 8 |
| 5 | 3 | 7 | 4 | 8 | 16 | 6 | 5 | 17 | 27 | 14 | 2 | 4 | 24 | 19 | 1 | 12 |
| 6 | 8 | 21 | 27 | 2 | 11 | 24 | 12 | 3 | 17 | 26 | 4 | 16 | 27 | 7 | 22 | 11 |
| 7 | 9 | 5 | 7 | 4 | 8 | 13 | 3 | 15 | 9 | 10 | 19 | 11 | 7 | 6 | 8 | 23 |
| 8 | 26 | 13 | 23 | 10 | 11 | 7 | 15 | 19 | 13 | 12 | 18 | 24 | 15 | 23 | 7 | 16 |
| 9 | 1 | 0 | 19 | 11 | 13 | 16 | 24 | 18 | 0 | 5 | 20 | 25 | 1 | 24 | 9 | 27 |
| 10 | 26 | 13 | 9 | 14 | 10 | 4 | 1 | 2 | 14 | 23 | 27 | 25 | 17 | 19 | 1 | 22 |
| 11 | 21 | 15 | 5 | 3 | 13 | 25 | 16 | 27 | 6 | 21 | 17 | 15 | 26 | 11 | 16 | 7 |
| 12 | 20 | 7 | 18 | 12 | 17 | 1 | 16 | 0 | 11 | 22 | 20 | 0 | 26 | 23 | 17 | 2 |
| 13 | 14 | 23 | 1 | 12 | 24 | 6 | 18 | 9 | 8 | 4 | 3 | 14 | 20 | 26 | 23 | 15 |
| 14 | 19 | 6 | 21 | 25 | 23 | 1 | 10 | 8 | 19 | 0 | 18 | 2 | 13 | 8 | 24 | 14 |
| 15 | 3 | 0 | 27 | 23 | 19 | 8 | 4 | 7 | 16 | 21 | 24 | 25 | 12 | 27 | 15 | 18 |
| 16 | 6 | 5 | 14 | 22 | 24 | 18 | 2 | 21 | 3 | 5 | 8 | 25 | 7 | 27 | 2 | 26 |
| 17 | 3 | 4 | 2 | 6 | 22 | 14 | 12 | 26 | 11 | 14 | 23 | 17 | 22 | 13 | 19 | 4 |
| 18 | 25 | 21 | 19 | 9 | 10 | 15 | 13 | 22 | 1 | 16 | 14 | 11 | 12 | 6 | 10 | 19 |
| 19 | 23 | 11 | 10 | 20 | 1 | 12 | 14 | 4 | 21 | 1 | 10 | 20 | 18 | 26 | 9 | 13 |
| 20 | 11 | 26 | 20 | 17 | 8 | 23 | 0 | 24 | 20 | 21 | 9 | 25 | 12 | 3 | 15 | 0 |
| 21 | 9 | 17 | 26 | 4 | 27 | 0 | 15 | 6 | 18 | 12 | 21 | 27 | 1 | 16 | 24 | 20 |
| 22 | 22 | 12 | 2 | 10 | 7 | 20 | 25 | 13 | 13 | 0 | 3 | 16 | 22 | 11 | 26 | 9 |
| 23 | 27 | 24 | 26 | 8 | 0 | 9 | 18 | 23 | 2 | 0 | 13 | 5 | 4 | 8 | 10 | 3 |

FIG. 5
(PRIOR ART)

METHOD AND SYSTEM FOR ENCRYPTING AND DECRYPTING DATA USING AN EXTERNAL AGENT

TECHNICAL FIELD OF THE INVENTION

The invention pertains to encryption of data (e.g., data to be transmitted over a TMDS link or other serial link), and to decryption of encrypted data (e.g., encrypted data that has been transmitted over a TMDS link or other serial link). Some embodiments of the invention are methods and systems for content protection using a transmitter that encrypts data, a receiver that receives and decrypts the encrypted data, and an external agent that communicates with at least one of the transmitter and receiver to facilitate the encryption and decryption.

BACKGROUND OF THE INVENTION

There are various, well-known serial links for transmitting video data and other data. One conventional serial link is known as a transition minimized differential signaling interface ("TMDS" link). This link is used primarily for high-speed transmission of video data from a set-top box to a television, and also for high-speed transmission of video data from a host processor (e.g., a personal computer) to a monitor. Among the characteristics of a TMDS link are the following:

1. video data are encoded and then transmitted as encoded words (each 8-bit word of digital video data is converted to an encoded 10-bit word before transmission);
   a. the encoding determines a set of "in-band" words and a set of "out-of-band" words (the encoder can generate only "in-band" words in response to video data, although it can generate "out-of-band" words in response to control or sync signals. Each in-band word is an encoded word resulting from encoding of one input video data word. All words transmitted over the link that are not in-band words are "out-of-band" words);
   b. the encoding of video data is performed such that the in-band words are transition minimized (a sequence of in-band words has a reduced or minimized number of transitions);
   c. the encoding of video data is performed such that the in-band words are DC balanced (the encoding prevents each transmitted voltage waveform that is employed to transmit a sequence of in-band words from deviating by more than a predetermined threshold value from a reference potential. Specifically, the tenth bit of each "in-band" word indicates whether eight of the other nine bits thereof have been inverted during the encoding process to correct for an imbalance between running counts of ones and zeroes in the stream of previously encoded data bits);
2. the encoded video data and a video clock signal are transmitted as differential signals (the video clock and encoded video data are transmitted as differential signals over conductor pairs without the presence of a ground line);
3. three conductor pairs are employed to transmit the encoded video, and a fourth conductor pair is employed to transmit the video clock signal; and
4. signal transmission occurs in one direction, from a transmitter (typically associated with a desktop or portable computer, or other host) to a receiver (typically an element of a monitor or other display device).

It is foreseeable that a common use for encryption will be to encrypt video data for transmission over a serial link from a set-top box to a television, and it has been proposed to encrypt video data for transmission over a TMDS serial link (e.g., from a set-top box to a television). For example, it has been proposed to use the cryptographic protocol known as the "High-bandwidth Digital Content Protection" ("HDCP") protocol to encrypt digital video data to be transmitted over the "Digital Video Interface" ("DVI" link) adopted by the Digital Display Working Group, and to decrypt the encrypted video data at the DVI receiver.

A DVI link can be implemented to include two TMDS links (which share a common conductor pair for transmitting a video clock signal) or one TMDS link, as well as additional control lines between the transmitter and receiver. We shall describe a DVI link (that includes one TMDS link) with reference to FIG. 1. The DVI link of FIG. 1 includes transmitter 1, receiver 3, and the following conductors between the transmitter and receiver: four conductor pairs (Channel 0, Channel 1, and Channel 2 for video data, and Channel C for a video clock signal), Display Data Channel ("DDC") lines for bidirectional communication between the transmitter and a monitor associated with the receiver in accordance with the conventional Display Data Channel standard (the Video Electronics Standard Association's "Display Data Channel Standard," Version 2, Rev. 0, dated Apr. 9, 1996), a Hot Plug Detect (HPD) line (on which the monitor transmits a signal that enables a processor associated with the transmitter to identify the monitor's presence), Analog lines (for transmitting analog video to the receiver), and Power lines (for providing DC power to the receiver and a monitor associated with the receiver). The Display Data Channel standard specifies a protocol for bidirectional communication between a transmitter and a monitor associated with a receiver, including transmission by the monitor of an Extended Display Identification ("EDID") message that specifies various characteristics of the monitor, and transmission by the transmitter of control signals for the monitor. Transmitter 1 includes three identical encoder/serializer units (units 2, 4, and 5) and additional circuitry (not shown). Receiver 3 includes three identical recovery/decoder units (units 8, 10, and 12) and inter-channel alignment circuitry 14 connected as shown, and additional circuitry (not shown).

As shown in FIG. 1, circuit 2 encodes the data to be transmitted over Channel 0, and serializes the encoded bits. Similarly, circuit 4 encodes the data to be transmitted over Channel 1 (and serializes the encoded bits), and circuit 6 encodes the data to be transmitted over Channel 2 (and serializes the encoded bits). Each of circuits 2, 4, and 6 responds to a control signal (an active high binary control signal referred to as a "data enable" or "DE" signal) by selectively encoding either digital video words (in response to DE having a high value) or a control or synchronization signal pair (in response to DE having a low value). Each of encoders 2, 4, and 6 receives a different pair of control or synchronization signals: encoder 2 receives horizontal and vertical synchronization signals (HSYNC and VSYNC); encoder 4 receives control bits CTL0 and CTL1; and encoder 6 receives control bits CTL2 and CTL3. Thus, each of encoders 2, 4, and 6 generates in-band words indicative of video data (in response to DE having a high value), encoder 2 generates out-of-band words indicative of the values of HSYNC and VSYNC (in response to DE having a low value), encoder 4 generates out-of-band words indicative of the values of CTL0 and CTL1 (in response to DE having a low value), and encoder 6 generates out-of-band words indicative of the values of CTL2 and CTL3 (in response to DE having a low value). In response to DE having a low value, each of encoders 4 and 6 generates one of four specific out-of-band words indicative of the values 00, 01, 10, or 11, respectively, of control bits CTL0 and CTL1 (or CTL2 and CTL3).

As noted above, it has been proposed to use the cryptographic protocol known as the "High-bandwidth Digital Content Protection" ("HDCP") protocol to encrypt digital video to be transmitted over a DVI link and to decrypt the data at the DVI receiver. The HDCP protocol is described in the document "High-bandwidth Digital Content Protection System," Revision 1.0, dated Feb. 17, 2000, by Intel Corporation, and the document "High-bandwidth Digital Content Protection System Revision 1.0 Erratum," dated Mar. 19, 2001, by Intel Corporation. The full text of both of these documents is incorporated herein by reference.

A DVI transmitter implementing the HDCP protocol asserts a stream of pseudo-randomly generated 24-bit words, known as cout[23:0], during the video active period (i.e. when DE is high). Each 24-bit word of the cout data is "Exclusive Ored" (in logic circuitry in the transmitter) with a 24-bit word of RGB video data input to the transmitter, in order to encrypt the video data. The encrypted data are then encoded (according to the TMDS standard) for transmission. The same sequence of cout words is also generated in the receiver. After the encoded and encrypted data received at the receiver undergo TMDS decoding, the cout data are processed together with the decoded video in logic circuitry in order to decrypt the decoded data and recover the original input video data.

Before the transmitter begins to transmit HDCP encrypted, encoded video data, the transmitter and receiver communicate bidirectionally with each other to execute an authentication protocol (to verify that the receiver is authorized to receive protected content, and to establish shared secret values for use in encryption of input data and decryption of transmitted encrypted data). More specifically, each of the transmitter and the receiver is preprogrammed (e.g., at the factory) with a 40-bit word known as a key selection vector, and an array of forty 56-bit private keys. To initiate the first part of an authentication exchange between the transmitter and receiver, the transmitter asserts its key selection vector (known as "AKSV"), and a pseudo-randomly generated session value ("An") to the receiver. In response, the receiver sends its key selection vector (known as "BKSV") and a repeater bit (indicating whether the receiver is a repeater) to the transmitter, and the receiver also implements a predetermined algorithm using "AKSV" and the receiver's array of forty private keys to calculate a secret value ("Km"). In response to the value "BKSV" from the receiver, the transmitter implements the same algorithm using the value "BKSV" and the transmitter's array of forty private keys to calculate the same secret value ("Km") as does the receiver.

Each of the transmitter and the receiver then uses the shared secret value "Km," the session value "An," and the repeater bit to calculate a session key ("Ks") and two values ("M0" and "R0") for use during a second part of the authentication exchange. The second part of the authentication exchange is performed only if the repeater bit indicates that the receiver is a repeater, to determine whether the status of one or more downstream devices coupled to the repeater requires revocation of the receiver's authentication.

After the first part of the authentication exchange, and (if the second part of the authentication exchange is performed) if the receiver's authentication is not revoked as a result of the second part of the authentication exchange, each of the transmitter and the receiver generates a 56-bit frame key Ki (for initiating the encryption or decrypting a frame of video data), an initialization value Mi, and a value Ri used for link integrity verification. The Ki, Mi, and Ri values are generated in response to a control signal (identified as "ctl3" in FIG. 2), which is received at the appropriate circuitry in the transmitter, and is also sent by the transmitter to the receiver, during each vertical blanking period, when DE is low. As shown in the timing diagram of FIG. 2, the control signal "ctl3" is a single high-going pulse. In response to the Ki, Mi, and Ri values, each of the transmitter and receiver generates a sequence of pseudo-randomly generated 24-bit words cout[23:0]. Each 24-bit word of the cout data generated by the transmitter is "Exclusive Ored" (in logic circuitry in the transmitter) with a 24-bit word of a frame of video data (to encrypt the video data). Each 24-bit word of the cout data generated by the receiver is "Exclusive Ored" (in logic circuitry in the receiver) with a 24-bit word of the first received frame of encrypted video data (to decrypt this encrypted video data). The 24-bit words cout[23:0] generated by the transmitter are encryption keys (for encrypting a line of input video data), and the 24-bit words cout[23:0] generated by the receiver are decryption keys (for decrypting a received and decoded line of encrypted video data).

During each horizontal blanking interval (in response to each falling edge of the data enable signal DE) following assertion of the control signal ctl3, the transmitter performs a rekeying operation and the receiver performs the same rekeying operation to change (in a predetermined manner) the cout data words to be asserted during the next active video period. This continues until the next vertical blanking period, when the control signal ctl3 is again asserted to cause each of the transmitter and the receiver to calculate a new set of Ki and Mi values (with the index "i" being incremented in response to each assertion of the control signal ctl3). The Ri value is updated once every 128 frames. Actual encryption of input video data (or decryption of received, decoded video data) is performed, using the cout data words generated in response to the latest set of Ks, Ki and Mi values, only when DE is high (not during vertical or horizontal blanking intervals).

Each of the transmitter and receiver includes an HDCP cipher circuit (sometimes referred to herein as an "HDCP cipher") of the type shown in FIG. 3. The HDCP cipher includes linear feedback shift register (LFSR) module 80, block module 81 coupled to the output of LFSR module 80, and output module 82 coupled to an output of block module 81. LFSR module 80 is employed to re-key block module 81 in response to each assertion of an enable signal (the signal "ReKey" shown in FIG. 3), using the session key (Ks) and the current frame key (Ki). Block module 81 generates (and provides to module 80) the key Ks at the start of a session and generates (and applies to module 80) a new value of key Ki at the start of each frame of video data (in response to a rising edge of the control signal "ctl3," which occurs in the first vertical blanking interval of a frame). The signal "ReKey" is asserted to the FIG. 3 circuit at each falling edge of the DE signal (i.e., at the start of each vertical and each horizontal blanking interval), and at the end of a brief initialization period (during which module 81 generates an updated value of the frame key Ki) after each rising edge of signal "ctl3."

Module 80 consists of four linear feedback shift registers (having different lengths) and combining circuitry coupled to the shift registers and configured to assert a single output bit per clock interval to block module 81 during each of a fixed number of clock cycles (e.g., 56 cycles) commencing on each assertion of the signal "ReKey" when DE is low (i.e., in the horizontal blanking interval of each line of video data). This output bit stream is employed by block module 81 to re-key itself just prior to the start of transmission or reception of each line of video data.

Block module 81 comprises two halves, "Round Function K" and "Round Function B," as shown in FIG. 4. Round Function K includes 28-bit registers Kx, Ky, and Kz, seven S-Boxes (each a 4 input bit by 4 output bit S-Box including a look-up table) collectively labeled "S-Box K" in FIG. 4, and linear transformation unit K, connected as shown. Round Function B includes 28-bit registers Bx, By, and Bz, seven S-Boxes (each a 4 input bit by 4 output bit S-Box including a look-up table) collectively labeled "S-Box B" in FIG. 4, and linear transformation unit B, connected as shown. Round Function K and Round Function B are similar in design, but Round Function K performs one round of a block cipher per clock cycle to assert a different pair of 28-bit round keys (Ky and Kz) each clock cycle in response to the output of LFSR module 80, and Round Function B performs one round of a block cipher per clock cycle, in response to each 28-bit round key Ky from Round Function K and the output of LFSR module 80, to assert a different pair of 28-bit round keys (By and Bz) each clock cycle. The transmitter generates value An at the start of the authentication protocol and the receiver responds to it during the authentication procedure. The value An is used to randomize the session key. Block module 81 operates in response to the authentication value (An), and the initialization value (Mi) which is updated by output module 82 at the start of each frame (at each rising edge of the control signal "ctl3").

Each of linear transformation units K and B outputs 56 bits per clock cycle. These output bits are the combined outputs of eight diffusion networks in each transformation unit. Each diffusion network of linear transformation unit K produces seven output bits in response to seven of the current output bits of registers Ky and Kz. Each of four of the diffusion networks of linear transformation unit B produces seven output bits in response to seven of the current output bits of registers By, Bz, and Ky, and each of the four other diffusion networks of linear transformation unit B produces seven output bits in response to seven of the current output bits of registers By and Bz.

In Round Function K, one bit of register Ky takes its input from the bit stream asserted by module 80 when the ReKey signal is asserted. In Round Function B, one bit of register By takes its input from the bit stream asserted by module 80 when the ReKey signal is asserted.

Output module 82 performs a compression operation on the 28-bit keys (By, Bz, Ky and Kz) asserted to it (a total of 112 bits) by module 81 during each clock cycle, to generate one 24-bit block of pseudo-random bits cout[23:0] per clock cycle. Each of the 24 output bits of module 82 consists of the exclusive OR ("XOR") of nine terms as follows: (B0*K0)+(B1*K1)+(B2*K2)+(B3*K3)+(B4*K4)+(B5*K5)+(B6*K6)+(B7)+(K7), where "*" denotes a logical AND operation and "+" denotes a logical XOR operation. FIG. 5 specifies the input values B0-B7 and K0-K7 in the preceding expression for generating each of the 24 output bits of module 82. For example, FIG. 5 indicates that in order to generate output bit 0 (i.e., cout(0)), B0 is the seventeenth bit of register Bz, K0 is the third bit of register Kz, B1 is the twenty-sixth bit of register Bz, and so on.

In the transmitter, logic circuitry 83 (shown in FIG. 3) receives each 24-bit word of cout data and each input 24-bit RGB video data word, and performs a bitwise XOR operation thereon in order to encrypt the video data, thereby generating a word of the "data_encrypted" data indicated in FIG. 3. Typically, the encrypted data subsequently undergoes TMDS encoding before it is transmitted to a receiver. In the receiver, logic circuitry 83 (shown in FIG. 3) receives each 24-bit block of cout data and each recovered 24-bit RGB video data word (after the recovered data has undergone TMDS decoding), and performs a bitwise XOR operation thereon in order to decrypt the recovered video data.

Throughout the specification and in the claims the expression "TMDS-like link" will be used to denote a serial link, capable of transmitting digital video data (and a clock for the digital video data) from a transmitter to a receiver, and optionally also transmitting one or more additional signals (bidirectionally or unidirectionally) between the transmitter and receiver, that is or includes either a TMDS link or a link having some but not all of the characteristics of a TMDS link.

There are several conventional TMDS-like links. One type of TMDS-like link is the set of serial links known as Low Voltage Differential Signaling ("LVDS") links (e.g., "LDI," the LVDS Display Interface), each of which satisfies the TIA/EIA-644 standard or the IEEE-1596.3 standard. In each system including an LVDS link, the data are sent on a high-speed differential link with a synchronous clock. There is a single clock line with a four to three duty cycle and several different combinations of data lines depending on the data rate and bit depth. An LVDS link is a serial and differential video link, but the video data transmitted over an LVDS link is not encoded.

Other TMDS-like links encode input video data and other data to be transmitted into encoded words comprising more bits than the incoming data using a coding algorithm other than the specific algorithm used in a TMDS link, and transmit the encoded video data as in-band characters and the other encoded data as out-of-band characters. The characters need not be classified as in-band or out-of-band characters based according to whether they satisfy transition minimization and DC balance criteria. Rather, other classification criteria could be used. An example of an encoding algorithm, other than that used in a TMDS link but which could be used in a TMDS-like link, is IBM 8b10b coding. The classification (between in-band and out-of-band characters) need not be based on just a high or low number of transitions. For example, the number of transitions of each of the in-band and out-of-band characters could (in some embodiments) be in a single range (e.g., a middle range defined by a minimum and a maximum number of transitions).

The data transmitted between the transmitter and receiver of a TMDS-like link can, but need not, be transmitted differentially (over a pair of conductors). Although the differential nature of TMDS is important in some applications, it is contemplated that some TMDS-like links will transmit data other than differential data. Also, although a TMDS link has four differential pairs (in the single pixel version), three for video data and the other for a video clock, a TMDS-like link could have a different number of conductors or conductor pairs.

The primary data transmitted by a TMDS link are video data. What is often significant about this is that the video data are not continuous, and instead have blanking intervals. However, many TMDS-like serial links do not transmit data having blanking intervals, and thus do not encode input data (for transmission) in response to a data enable signal. For example, the audio serial links known as I$^2$S and S/PDIF transmit continuous data.

We shall refer to content protection protocols other than the HDCP protocol as "non-HDCP" protocols. Not only content protection protocols that closely resemble the HDCP protocol (but differ therefrom in one or more respects), but also content protection protocols very different from the HDCP protocol, shall be referred to as "non-HDCP protocols."

Aspects of the present invention employ (or are useful in implementing) encryption and/or decryption of data in accordance with the HDCP protocol, or non-HDCP protocols that are modified versions of the HDCP protocol in which the transmitter and receiver obtain the shared secret value ("Km"), directly or indirectly, from an external agent. Other aspects of the present invention employ (or are useful in implementing) encryption and/or decryption of data in accordance with other non-HDCP protocols.

Some embodiments of the invention contemplate that encrypted data is transmitted over a serial link. Other embodiments do not require that encrypted data are transmitted over a serial link. Examples of serial links include the above-mentioned DVI, TMDS, and TMDS-like links, ethernet links, fiberchannel links, serial ATA links used by disk drives, and others.

SUMMARY OF THE INVENTION

In a class of embodiments, the invention is a communication system including a transmitter, a receiver, and a serial link (e.g., a TMDS-like link) in which data (e.g., video data or audio data) are encrypted, the encrypted data are transmitted over the link from the transmitter to the receiver, and the transmitted data are decrypted in the receiver. Other aspects of the invention are transmitters and receivers for use in such systems, cipher engines for use in such transmitters or receivers, encryption and decryption methods, and methods for authenticating receivers prior to transmission of encrypted data to such receivers over a serial link.

Conventional encryption methods and systems often use keys that are either captive (contained wholly within a transmitter or receiver, and seldom or never changing) or limited in number (sometimes distributed with the media that stores the encrypted content). In a class of embodiments, the invention is a system including a transmitter, a receiver, at least one TMDS-like link between the transmitter and receiver (and optionally a translating router or other router coupled to the transmitter or receiver by one such TMDS-like link), and an external agent which provides at least one key to at least one of the receiver and transmitter, so that the system can operate using more keys, the keys can be changed frequently, and the keys can be limited either in scope (allowable use), in time (with an expiration date), or in some other way (for a particular person or family, for example). The external agent is itself a system or device distinct from the receiver and the transmitter. In preferred embodiments, the external agent accomplishes key distribution in a refined manner to allow for very strong cryptographic security, and to support encryption at the high data rates required for fast digital connections. More generally, an external agent is employed in such a system including a TMDS-like link in accordance with the invention to perform at least one encryption, decryption, or authentication function, such as:

verification of the identity of at least one of the receiver and transmitter by examination of a cryptographically secure digital signature;

generation of key material for use by at least one of the transmitter and receiver in an encryption and/or decryption process. The key length can vary on-the-fly, for example to suit the needs of the application or to satisfy export control requirements. The key value can also vary on an as-needed basis, and can contain qualifiers (such as expiration dates, expected uses, copy permissions, or specific contents);

maintenance of a revocation list (or other database) which identifies devices that are not authorized to perform encryption or decryption. A revocation database is kept in a central location (and optionally also in a small number of reflector locations) so that it is manageable (even if very large) and easily updated. A revocation database can also contain additional information and can allow revocation based on product make or model, date of manufacture, or other criteria; and maintenance of an audit trail of accesses and behaviors, and use of this information to help improve overall security. For example, the external agent can detect accesses that are too frequent, or that follow suspicious patterns, or that seem to show that one device ID is being simultaneously used in multiple locations.

In some embodiments, the receiver is a player that forwards the decrypted data (or a translated version of the decrypted data) to a downstream device. Optionally, the player translates the decrypted data in some way, re-encrypts the translated data, and then forwards the re-encrypted, translated data. The player can be coupled to a decrypting display by a TMDS-like link, and configured to re-encrypt the decrypted data (for example, using an AES or HDCP protocol) and send re-encrypted data over the link to the decrypting display.

In preferred embodiments, the system of the invention implements a symmetric content protection protocol including a challenge-response procedure. After a new key is supplied to the receiver (and the same new key should have been supplied to the transmitter) and before the receiver can use the new key, the challenge-response procedure is performed to allow the receiver to validate the transmitter by verifying that the transmitter has proper knowledge of the new key.

Other aspects of the invention are methods implemented by any of the embodiments of the inventive system and apparatus.

BRIEF DESCRIPTION OF THE DRAWINGS

FIG. 5 is a table of values employed by module 82 of FIG. 3 to operate on the values asserted thereto by module 81.

DETAILED DESCRIPTION OF THE PREFERRED EMBODIMENTS

Figure 1:
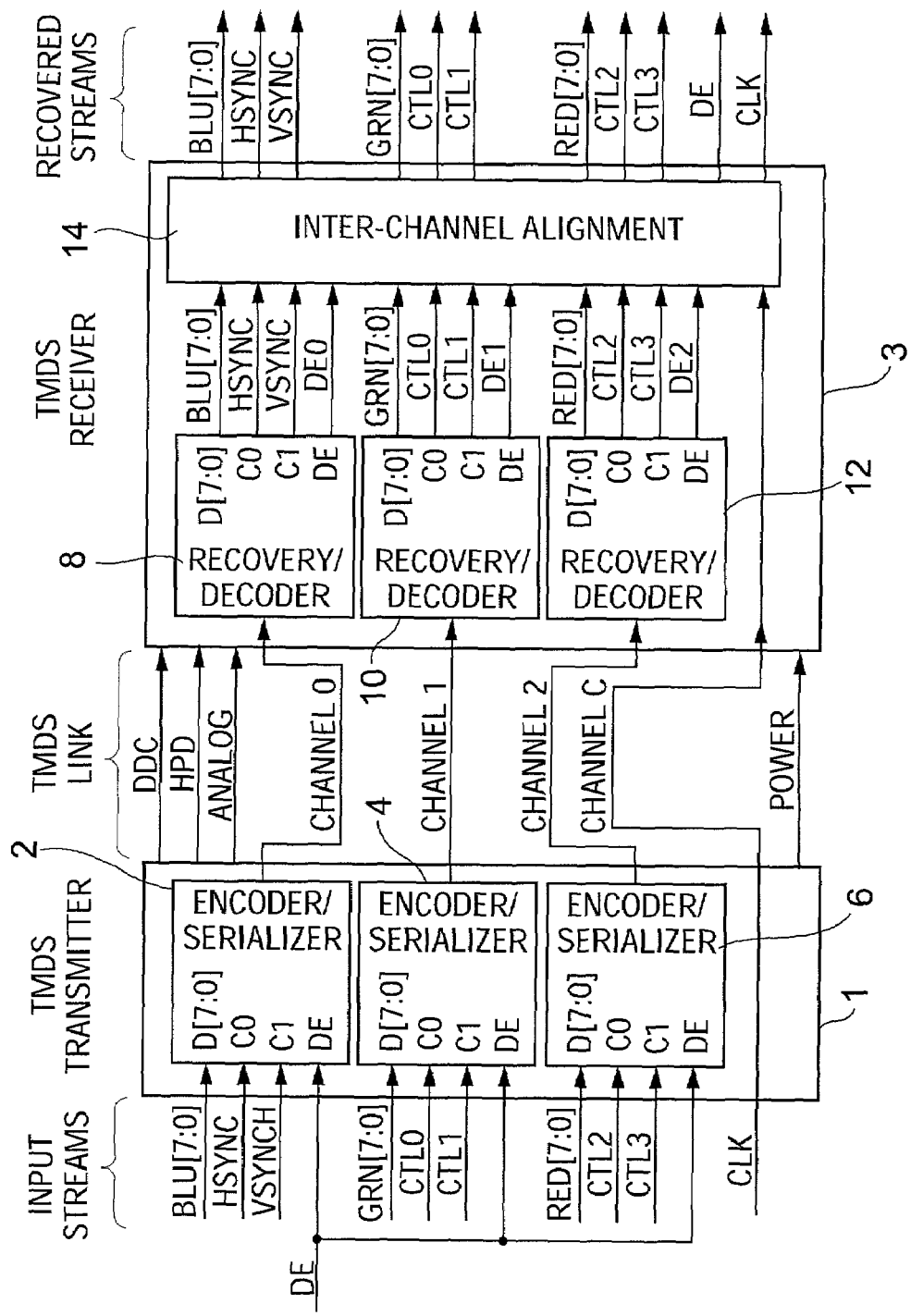
FIG. 1 is a block diagram of a conventional system including a Digital Video Interface ("DVI") link.
Figure 2:
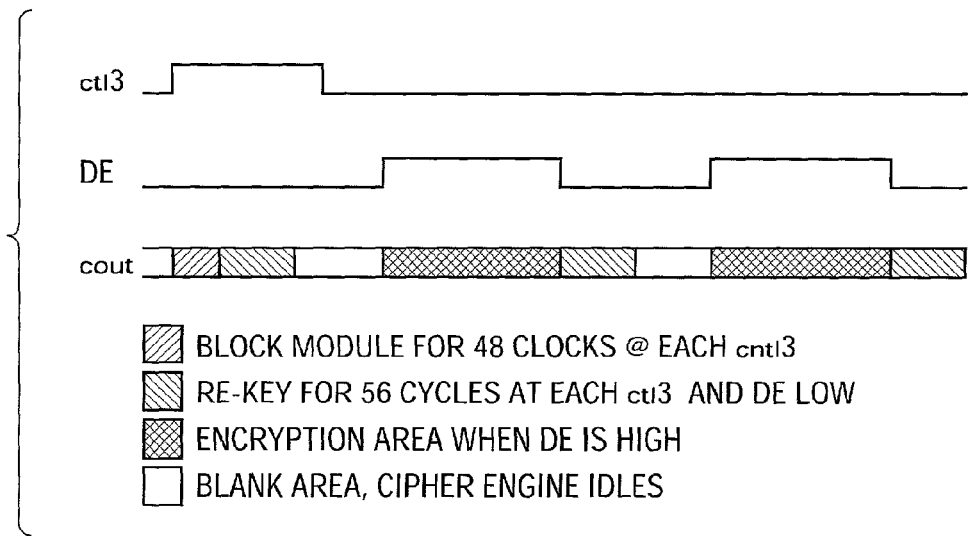
FIG. 2 is a timing diagram of signals generated conventionally to encrypt digital video data to be transmitted over a DVI link using the High-bandwidth Digital Content Protection ("HDCP") protocol.

It should be appreciated that the term "transmitter" is used herein in a broad sense to denote any unit capable of transmitting data over a communication link (and optionally also encoding and/or encrypting the data to be transmitted), and the term "receiver" is used herein in a broad sense to denote any unit capable of receiving data that has been transmitted over a communication link (and optionally also decoding and/or decrypting the received data). Unless otherwise specified, the link can, but need not, be a TMDS-like link or other serial link. For example, the term transmitter can denote a transceiver that performs the functions of a receiver as well as the functions of a transmitter.

In another example, the term "transmitter" denotes a processor programmed with software for implementing a variation on the HDCP protocol to communicate with a graphics controller (with the graphics controller functioning as a "receiver"). Such a processor can send video data to the graphics controller after executing an authentication exchange (in accordance with this version of the HDCP protocol). The processor and graphics controller can be elements of a personal computer configured to send encrypted video data from the graphics controller to a display device. The graphics controller and display device can be configured to execute another encryption protocol (e.g., the standard HDCP protocol discussed above) to allow the graphics controller (this time functioning as a "transmitter") to encrypt video data and send the encrypted video to the display device, and to allow the display device (functioning as a "receiver") to decrypt the encrypted video.

We shall use the abbreviation "KSV" herein to denote "key selection vector."

Other expressions employed herein include the following:

Asymmetric Key Encryption: A type of encryption (also called "public-key encryption") that employs two keys: a public key and a private key. The public key is published in a public directory and the corresponding private key is kept secret. The sender of the data encrypts the data with the public key of the receiver. The data can be decrypted only with the private key of the receiver. Public-key encryption is more computationally intensive than symmetric key encryption, and so is not often used for large amounts of data.

Advanced Encryption Standard (or "AES"): A cryptographic algorithm (sometimes referred to as the "Rijndael" algorithm) specified by a recent Federal Information Processing Standards (FIPS) Publication, for use by U.S. Government organizations to protect sensitive information. The National Institute of Standards and Technology (NIST) has indicated that it anticipates that the AES algorithm will be widely used on a voluntary basis by organizations, institutions, and individuals.

Counter (CTR) Mode Encryption: A technique for using a block cipher to generate pseudo-random numbers, which can in turn be used to encrypt or decrypt data. In essence, the block cipher processes a sequence of count values (from counter circuitry) using a secret key, to produce a sequence of pseudo-random numbers. This technique is conceptually simple, and yet very secure if the block cipher is a good one. The count values do not need to be kept secret, but they must not be re-used. The inputs to the block cipher do not depend on the block cipher's outputs when this technique is employed, which offers two major advantages. First, the implementation can be readily parallelized for best performance. Second, transmission errors remain localized to the specific bits where the error occurred. They do not cascade or propagate.

Downstream: Toward the device (e.g., display device) that is the final destination of decrypted data.

Upstream: Toward the source of a stream (or other quantity) of encrypted data.

HDCP Repeater: A device, employed in a system implementing the High-bandwidth Digital Content Protection ("HDCP") protocol or a modified HDCP protocol (e.g., a modified version of the HDCP protocol in which the transmitter and receiver obtain the shared secret value ("Km") directly or indirectly from an external agent), that receives HDCP-encrypted data (e.g., video data) and transmits the data downstream to another device of the system. The HDCP protocol allows up to seven levels of repeaters, and a maximum of 128 devices (including repeaters), to be attached to a host DVI port.

HDCP Receiver: A device, employed in a system implementing the High-bandwidth Digital Content Protection ("HDCP") protocol or a modified HDCP protocol (e.g., a modified version of the HDCP protocol in which the transmitter and receiver obtain the shared secret value ("Km") directly or indirectly from an external agent), that receives and decrypts HDCP-encrypted data (e.g., video data).

HDCP Transmitter: A device, employed in a system implementing the HDCP protocol or a modified HDCP protocol (e.g., a modified version of the HDCP protocol in which the transmitter and receiver obtain the shared secret value ("Km") directly or indirectly from an external agent), that transmits HDCP-encrypted data.

Key Exchange: The process by which secret key material is distributed to both sides of a link. This is a requirement for any symmetric key mechanism.

$K_L$: A shared secret key used by both sides of a TMDS-like link, in a class of embodiments of the invention, for video encryption and decryption. It is a symmetric key, and must remain absolutely confidential. If it were ever revealed, the link security would be thoroughly compromised for the duration of the session. It must be changed from time to time to maximize security (when Counter Mode encryption is employed, the encryption sequence will repeat if the same combination of $K_L$ and count values is used).

Key Sequence Code (KSC): A number, assigned to each $K_L$ value (typically by a content authority), that is used to identify the $K_L$ value. When the KSC values are assigned by a content authority, the correspondence between each KSC value and the corresponding $K_L$ value is at the discretion of the content authority (but the KSC value should not be a hash or other function of the corresponding $K_L$ value). The KSC values are non-secret, and can be readily exchanged in the open.

Receiver: A device (which can be a set-top box) that receives encrypted data and generates decrypted data by decrypting the encrypted data. In a class of embodiments, the inventive system includes a receiver authorized by a content authority to receive and decrypt encrypted data, and optionally also to translate the decrypted data in a pre-approved manner. This translation can include conversion of the data into analog form for immediate display, and can also include limited copying or retransmission.

Router: A device that receives encrypted content (e.g., digital data) and forwards the content, or receives encrypted content, decrypts (or otherwise modifies or translates) the encrypted content, and then forwards the translated (e.g., modified) content. One type of router (sometimes referred to herein as a "switch") receives encrypted data and forwards the encrypted data without decrypting or translating it in any way. A switch buffers the forwarded data to allow for longer links, and can be coupled between at least two transmitters and at least two receivers and configured to selectively forward data from any of the transmitters to all of the receivers or to any selected one (or subset) of the receivers (all the downstream links coupled to the selected upstream link will have the same resolution and timing characteristics).

Translating Router: a router that decrypts, modifies, or otherwise translates encrypted data to produce translated data, and then forwards the translated data. The translation can include re-encryption.

Repeater: a device that is a receiver and a translating router, and that receives and decrypts encrypted data, then translates (e.g., modifies) the decrypted data in some way, then re-encrypts the translated data, and then forwards the re-encrypted, translated data. A repeater can implement features such as video scaling, format translation, "picture-in-picture", on-screen displays, translation of non-HDCP-encrypted data to HDCP-encrypted data, and so on. Note that data asserted by a translating router to different downstream links can have different resolution and timing characteristics.

Player: a receiver that retransmits the decrypted data that it generates; or translates the decrypted data in some way (e.g., by converting decrypted video data into analog form for display, or re-encrypting decrypted data, or modifying decrypted data in some way and re-encrypting the modified data) and transmits the translated data. In a class of embodiments, the inventive system includes at least one player authorized by a content authority to receive and decrypt encrypted data, translate the decrypted data in a pre-approved manner, and retransmit the translated data. A player that decrypts encrypted data, translates the decrypted data in some way, and transmits the translated data is one example of a "translating router" (as defined above).

Content Authority: A system, organization, or other entity responsible for approving the designs of receivers, certifying their compliance with a set of predetermined criteria, assigning an identifier to each approved receiver, and typically also registering public keys for approved receivers. A content authority typically also keeps a list of receivers (or categories of receivers) that are known to be compromised, and provides a certificate and revocation database.

TMDS Cipher: A block of logic that either encrypts a data stream (which can but need not be a video data stream) for transmission over a TMDS-like link, or decrypts a data stream received over a TMDS-like link. This includes the actual cipher, shared key distribution logic, and scheduling circuitry.

Decrypting Display: a receiver that is (or includes) an integrated television, monitor, or similar device that includes: a cipher engine (configured to decrypt video data), additional support circuitry, and a video display. Preferably, the integration is accomplished such that it is difficult or impossible for a user to obtain access to an unencrypted video signal generated by the decrypting display, and the decrypting display does not have any video outputs.

RSA protocol: A public-key content protection protocol that offers both encryption and digital signatures (authentication). Ronald Rivest, Adi Shamir, and Leonard Adleman developed the RSA protocol in 1977.

Symmetric Key Encryption: A type of encryption (sometimes referred to as "private-key encryption") in which the transmitter and receiver of a message share a single key (e.g., the above-described $K_L$ key) that is a shared secret of the transmitter and receiver, and is used both to encrypt and decrypt the message. Symmetric key encryption is simpler and faster than public-key encryption, but requires that a mechanism is provided for the transmitter and receiver to exchange the shared secret key in some secure way. Public-key encryption does not require a key exchange because the private keys used in public-key encryption are never transmitted or disclosed.

Ticket: Data, delivered to a transmitter or receiver (e.g., by a content authority, or by a content owner after consulting a content authority) in response to an associated request, that enables the receiver that receives the ticket (or a receiver that is coupled to the transmitter receiving the ticket) to decrypt an encrypted version of content specified in the request. A ticket contains each key necessary for decrypting the content (or it enables the receiver to obtain each such key), but the ticket itself (or one or more keys or other elements of the ticket) itself is optionally encrypted. Typically, a ticket is valid only when used by a specific receiver, and optionally only during a specific time interval. Typically, each ticket request includes at least limited information about the capabilities of the receiver for whom the ticket is requested, at least to the extent that such capabilities can affect the decision as to whether to grant the request.

Figure 6:
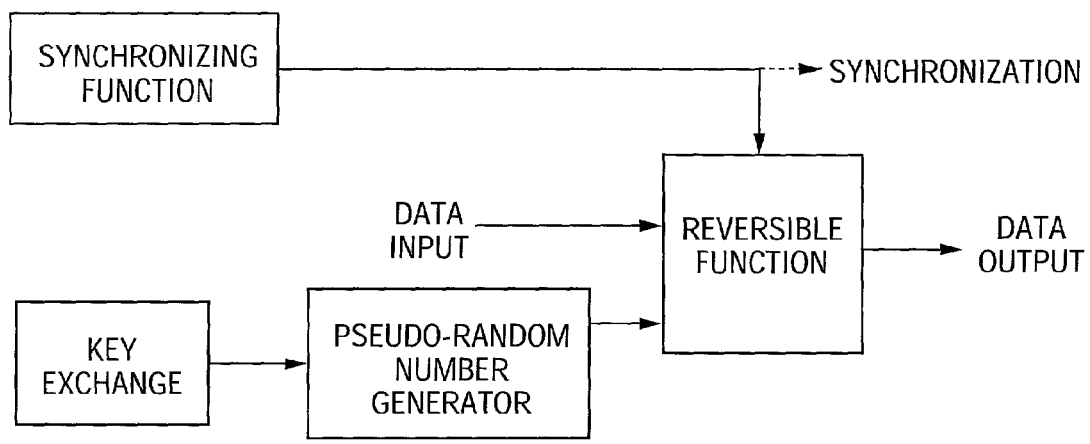
FIG. 6 is a block diagram of functions performed to encrypt data using a symmetric protocol for transmission over a TMDS-like link in accordance with the present invention, or to decrypt such data that has been transmitted over a TMDS-like link.
Figure 3:
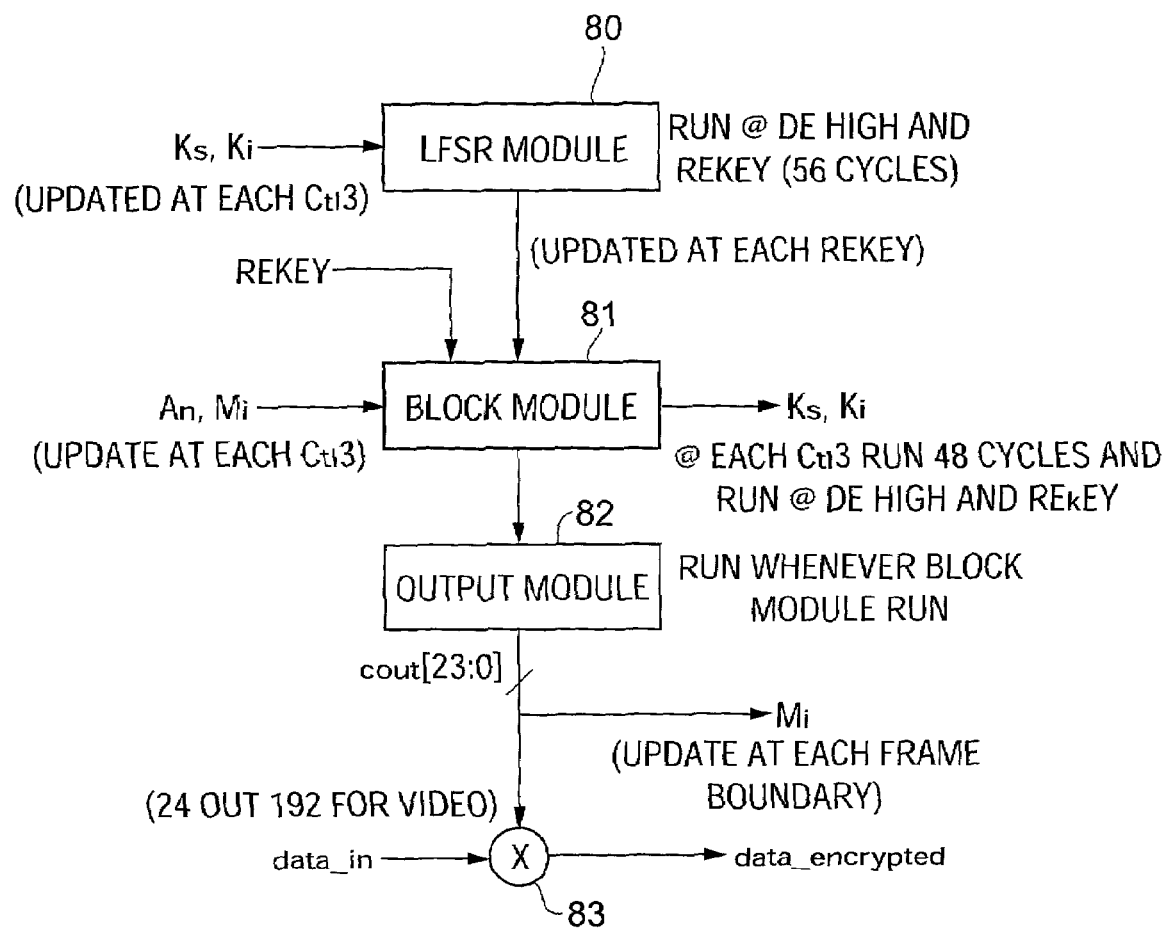
FIG. 3 is a block diagram of conventional circuitry for encrypting digital video data to be transmitted over a DVI link.
Figure 4:
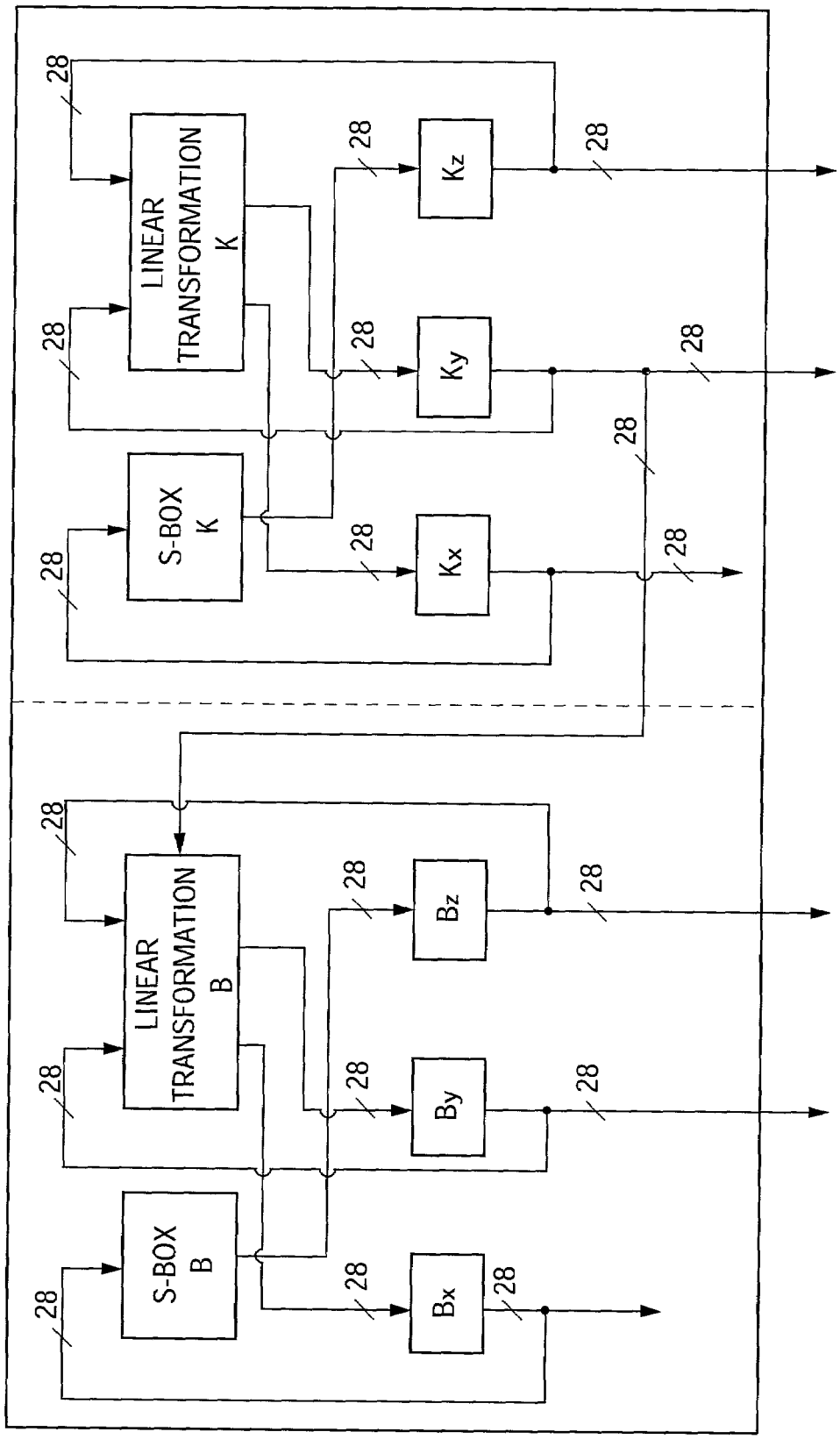
FIG. 4 is a simplified block diagram of module 81 of FIG. 3.

FIG. 6 is a block diagram of the functions performed to encrypt data in accordance with a symmetric protocol (either an HDCP protocol or a non-HDCP protocol) in accordance with the present invention for transmission over a TMDS-like link, and to decrypt data that has been transmitted over a TMDS-like link. The structure shown in FIG. 6 is implemented at both sides of the TMDS-like link. The input data (identified as "Data input" in FIG. 6) at the encrypting side of the link is raw data, the input data at the decrypting side of the link is the encrypted data generated by the encrypting side, and the output data (identified as "Data output" in FIG. 6) of the decrypting side is typically clear (nonencrypted) data.

The "key exchange" function of FIG. 6 is responsible for producing a key (data indicative of a unique number, which is typically a large number) for use in generating pseudo-random numbers. Since FIG. 6 implements a symmetric protocol, the same key must be provided at both sides of the link (e.g., at both a transmitter which encrypts data and at a receiver which decrypts the encrypted data) when it is desired that the "pseudo-random number generator" (PRNG) function on one side of the link operates in response to the same seed as does the PRNG function on the other side of the link, to produce the same pseudo-random value stream on both sides in response to the same seed. There are many ways to perform a key exchange function. A small number of keys can be pre-programmed for later use, but this is cumbersome and severely limits flexibility (and/or security). Keys can be generated (e.g., in both a transmitter and a receiver) in accordance with a predetermined algorithm, with or without external "seeds," but security will be compromised if the details of the algorithm become publicly known or are reverse-engineered.

The "key exchange" function can receive externally supplied keys (e.g., encrypted keys) or externally supplied "seeds" for use in generating or selecting keys. There are many ways to deliver such keys or seeds to the "key exchange" function. One employs an external data entry system such as a password, bar code, or smart card; another employs a private and very secure channel between the source and recipient of the key or seed. In a class of embodiments of the invention, a trusted third-party agent (distinct from both the transmitter and receiver) delivers a key (or sequence of keys) to both sides of the link. If each key can be delivered securely to both sides of the link, the protocol will closely approximate a "one-time-pad", which is the only truly perfect cipher.

In the description of those embodiments of the invention employing a trusted third-party agent (sometimes referred to herein as a "content authority" or "external agent"), the content authority has the capability to perform a particular function that is described in the context in which the content authority is mentioned. In some preferred embodiments, the content authority uses public-private key pairs to securely deliver keys to all devices that will use the keys to encrypt (or decrypt) content. In some such embodiments and in other embodiments, the content authority performs the functions of a conventional "certificate authority." A conventional "certificate authority" is a trusted third-party agent that issues digital certificates that are used to create or verify digital signatures and public-private key pairs (e.g., for secure communication over the internet), to guarantee that the individual granted the unique certificate is, in fact, who he or she claims to be. Usually, a certificate authority has access to some specific information (delivered or maintained separately) that allows it to confirm an individual's claimed identity.

The key exchange function of FIG. 6 can implement combinations of two or more key exchange mechanisms. The key exchange mechanism used can vary with the application, or the type of content, or the desired use. Or multiple key exchange methods can be used in concert, each delivering some portion of the key. This latter approach has a number of advantages. For example, if one portion of the system fails and a corresponding portion of the key is compromised, overall system security can still be maintained.

Still with reference to FIG. 6, once each side of the TMDS-like link has the key, the key is used to seed a "pseudo-random number generation" (PRNG) function. The pseudo-random number generation function can be implemented in any of many different ways, most of which fall into two classes: "stream" ciphers; and "block" ciphers. The best choice for implementing the PRNG function depends on the kind of data, how the data are organized, and how much of it there is. A stream cipher is essentially designed to generate pseudo-random numbers to be combined with a stream of input data bits (or words). Stream ciphers are fast and efficient, but also generally less secure than block ciphers. A block cipher can be designed to generate pseudo-random numbers that are to be combined with blocks of input data (input data organized into large chunks). Block ciphers tend to be slower and more compute-intensive, but are generally more secure than stream ciphers.

The "reversible function" (indicated as a separate block of FIG. 6) combines the input data values with the pseudo-random numbers generated by the PRNG function, and is reversible in the sense that data encrypted by a first pass through the reversible function is decrypted (restored to its original state) by undergoing a second pass through the reversible function. It is not strictly necessary to implement the reversible function separately from the PRNG function. Indeed, either a stream or a block cipher (implementing a PRNG function, and coupled to receive the input data) often incorporates the functionality of the "reversible function" of FIG. 6. The PRNG and reversible function blocks are separated in FIG. 6 for clarity, and because implementing them separately allows a system to have greater flexibility in attaining the desired level of security.

In a class of embodiments of the invention, the content protection protocol employed includes the following features:

an efficient, high-quality block cipher for the PRNG function;

a mode of operation for the block cipher that guarantees that its successive inputs will not be dependent on either the input data stream or the cipher outputs. This allows the block cipher to be implemented in a highly pipelined manner, which offers good speed and prevents (or reduces) the tendency for errors to propagate; and a simple "reversible" function (separate from the block cipher PRNG function). Since this function is its own inverse (e.g., it is an XOR operation), it can be implemented with logic circuitry that can be used either to encrypt or decrypt data.

Such a block cipher PRNG function and "reversible" function can be implemented to have superior error characteristics, so that bit-errors that occur during transmission over the link are (or tend to be) confined to their original location, and do not propagate far.

Among the many block ciphers, both standardized and proprietary, that can be employed in different embodiments of the invention are those implementing the conventional DES algorithm, Triple DES algorithm, or Advanced Encryption Standard ("AES") algorithm, or any one of the AES candidate algorithms. The best choice for a particular application will depend on the goals to be achieved and the allowable cost. The AES algorithm has a number of advantages, and will be the preferred choice in many applications.

For each algorithm, there are typically several possible operational modes. In general, the cipher outputs and inputs are connected in different ways in different operational modes. Among the operational modes for the AES algorithm are "Counter" (CTR) and "Output Feedback" (OFB) modes. The CTR mode of AES (or a variant of the CTR mode) is particularly well suited for encryption of data transmitted over a DVI or TMDS link (and for decryption of the transmitted data) because it is easily pipelined, and its security characteristics are both good and verifiable. In some embodiments of the invention, the cipher operates in a sequence of CTR and OFB modes. For example, in some embodiments in which video data is encrypted (or decrypted), the cipher is operated during active video intervals in a CTR mode with a reduced number of "rounds" (each "round" is a cycle of data processing performed by the cipher to generate a pseudo-random value), and in an OFB mode during blanking intervals. More generally, some embodiments of the invention employ a cipher that operates intermittently in a CTR mode (e.g., with a reduced number of rounds), with intervals of OFB mode operation interspersed between the times of CTR mode operation. The principal advantage of such interspersed (CTR and OFB) mode operation is to reduce the computational requirements (by reducing the number of rounds) when operating at high speeds, while retaining some of the security benefits associated with a full number of rounds.

In general, when implementing the invention, a trade-off must always be made to determine the number of rounds used to randomize the stream of pseudo-random values generated by the PRNG function. Typically, if only one round is performed, the resulting stream of "pseudo-random" values is not be adequately randomized. Also typically, if hundreds of rounds are performed to generate each pseudo-random value, the resulting stream of pseudo-random values will be very random, but the PRNG function will have done a lot more work than necessary to achieve an adequate degree of randomness. There is typically an optimal number of rounds somewhere between the extremes.

Even very good ciphers are vulnerable to attack if the PRNG function does not perform a sufficient number of rounds to generate each pseudo-random value. However, each round has a cost associated with it, and this cost can be particularly high if the cipher is run at a high speed. Some balance must be found. The result may depend on the type of content. Content that is "randomly" accessible (such as a computer file) can be slowed down as necessary to meet the cipher's capabilities. However, streaming content (such as audio or especially video) cannot be easily slowed or interrupted.

One compromise, employed in a class of embodiments of the invention, is to vary the number of rounds to match the throughput needs. When encrypting video data (for transmission over a typical TMDS or DVI link), there are bursts of data (video lines, also known as active video periods) separated by periods of inactivity (blanking intervals). In this case, the PRNG function can be implemented to perform a full number of rounds in each blanking interval, and only a very few (e.g., five) during each active video period.

There are other solutions too. For example, if a large number of rounds are necessary, the cipher can be run faster (e.g. using a faster clock or more pipelining) or more data can be processed during each interval of time (e.g., the size of each block of pseudo-random values generated during a processing period of N clock cycles can be doubled, to double the throughput of the PRNG function). Or, additional cipher blocks can be added to process more data at the same time.

In cryptography, encryption and decryption most often occur at different times (this is known as "asynchronous" operation), which requires that some kind of synchronization is included in the message transmitted over the link. This can be accomplished by transmitting a data structure (or signal) indicating the start of a message, or by transmitting special characters or sub-messages. "Instantaneous" links (or links with known or predictable delays) can be implemented to operate asynchronously in this way, but they can alternatively be implemented to operate "synchronously" so that the encryption and decryption happen at the same time (in the logical sense). Synchronous operation (established by a "synchronizing function" as shown in FIG. 6 on each side of the link) requires use of some mutual, external time reference that signals both sides when to start. A TMDS (or DVI) link is configured to provide such a mutual, external time reference to both sides of the link, and thus can be implemented to accomplish encryption and decryption synchronously, asynchronously, or both synchronously and asynchronously (simultaneously, so that one verifies the other, or for different types of data). For example, synchronous operation can be used for encrypting and decrypting video data transmitted over the link (since video data transmission includes transmission of handy timing references), and asynchronous operation can be used for encrypting and decrypting audio data transmitted over the link (since audio data transmission may not include transmission of timing references).

In some embodiments of systems that employ the FIG. 6 structure on both sides of a TMDS-like link, the encryption unit on one side of the link works in unison with the decryption unit on the other side of the link. In other embodiments, encryption and decryption occur asynchronously. In all practical embodiments, the system must be implemented in such a manner that the decryption unit knows when to start decryption. Preferably, the system is implemented so that both sides of the link know whether the encryption and decryption processes are working properly.

Synchronous encryption and decryption can be implemented in any of several ways. Prior arrangement is one choice (for example, to encrypt and decrypt video data, the first full vertical sync pulse of the unencrypted video can be used as a reference by the encryption unit, and the first full vertical sync pulse of the encrypted video can be used as a reference by the decryption unit). Another choice is a handshake of some sort (e.g., to encrypt and decrypt video data, the encrypting unit and decrypting unit can exchange information and agree that the next sync pulse will be the reference). Preferably, synchronous operation is established with a handshake, since a handshake can be arranged to accommodate any setup time needed and can be easily repeated.

The handshake procedure should be reliable. The handshake itself can be the timing reference, but it is typically better for the handshake to determine some other timing reference. Typically, the handshake's timing can be "loose" and non-critical, or less predictable than that of the timing reference to which the handshake points (e.g., where the handshake requires some exchange or agreement that is difficult to bound, or requires coordination with other link requirements) and the accuracy needed can be supplied by the reference to which the handshake points.

The handshake can be implemented in a simple manner, with each side (or one side, in the case of a one-sided handshake) transmitting a single dedicated pulse, a predefined bit location, or other simple electrical signal. Such a simple handshake has a number of advantages (high speed and low cost being among the most important), but it also has some important disadvantages. For example, glitches or other errors or interference conditions might hinder accurate communications. There might also be timing differences too, even within the bounds of a specification.

Preferably, each side (or one side, in the case of a one-sided handshake) transmits a more accurately distinguishable signal during the handshake, such as an actual message (some collection of bits), a pulse-train or other more complex electrical signal, or a combination of pulses or signals (e.g., on different wires or in different time slots). If each side transmits a pulse-train during a handshake, the pulse-train should have distinct characteristics so as to be discernible against even the worst case background "noise" (including bit-errors in the link). It can be fatal to either miss a handshake, or to detect an extra one, so the handshake should guard against both.

Even after synchronous operation has been established, it is unlikely to continue over an extended period of time without interruption, either due to errors, "channel changes," or other circumstances. Thus, typical embodiments of the invention are capable of performing re-synchronization. Ideally, re-synchronization is performed in the background, without interrupting the flow of data over the link any more than necessary. One technique for performing re-synchronization includes the steps of delivering new key material to each side of the link, and reaching a new agreement about when both sides will use the new key material. Another technique for performing re-synchronization includes the steps of saving occasional "checkpoint" states (copies of the system state when the synchronization is known or assumed to be good) and then going back to the last checkpoint state when necessary (again, at a mutually agreed point in time). These and other re-synchronization methods are not mutually exclusive. Indeed, often a combination of approaches or capabilities gives the best performance. In some preferred embodiments, the system is placed in a known initial state by the key delivery operation (which preferably includes the challenge-response operation discussed below), and a counter (in each cipher engine) increments in such a way that its next state (e.g., at various video boundaries) is immune (or relatively immune) to events that have occurred since the most recent key delivery operation.

Preferred embodiments of systems that employ the FIG. 6 structure on both sides of a TMDS-like link are configured to perform link verification. Preferably, the system is capable of performing link verification to verify that the link is operating properly (and does not need some special intervention), and in response to a request by an external agent (e.g., a "content authority") for verification of compliance with some set of rules. Preferably, verification occurs on a continual basis. A compromise is to perform verification at regular intervals. If the latter approach is used the interval must be short enough to limit the inconvenience a link break would cause, and to narrow the window of opportunity for any "hacker".

One verification approach is to examine the "plaintext" output (the decrypted output of the downstream side of the link in response to a predetermined input, such as a sequence of identical bits or a sequence of bits that determine a simple pattern). The source of the input data can include additional or special information that makes this test even more definitive (such as a checksum of the data, or a watermark). Another way to perform verification is to capture some secondary result from the cipher (e.g., on each side of the link), and then compare this result to an expected value (either self-calculated or exchanged with the other party in the transfer). One example of such an expected value secondary result is another result from the cipher (either from a different round, or some otherwise unused bits, or from a special (additional) calculation, etc. Another way to perform verification is to somehow send the encrypted and then decrypted data back to its original source (either in original form, or somehow re-packaged yet again).

Figure 7:
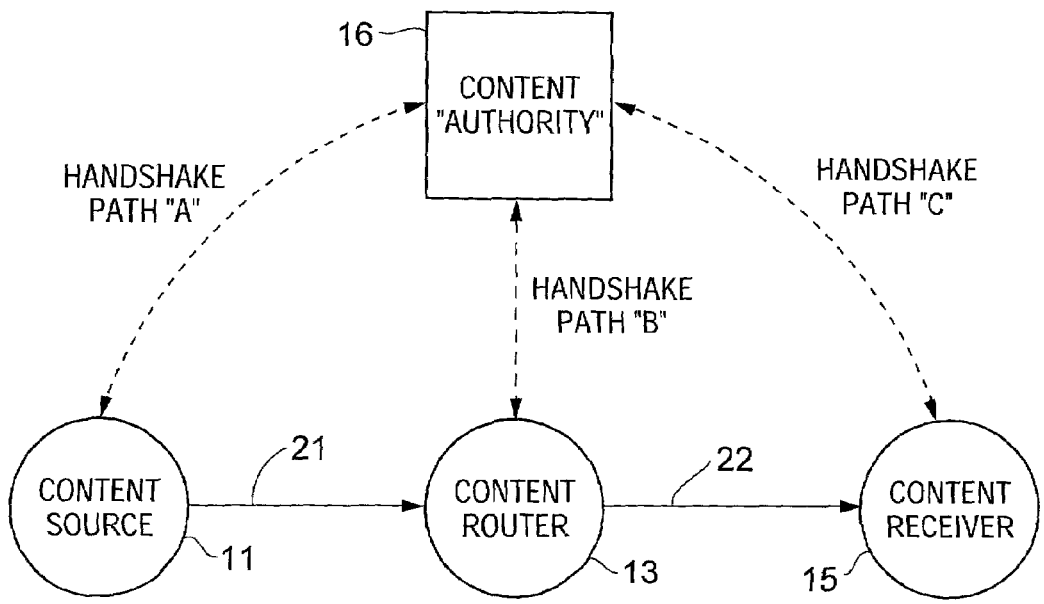
FIG. 7 is a greatly simplified block diagram of a system that can be implemented in accordance with the present invention.

We next describe another class of embodiments of the invention with reference to FIG. 7.

The conventional HDCP protocol, and many other conventional content protection protocols, are typically implemented by a standalone (self-contained) system in which a transmitter communicates directly with a receiver over a serial link. Such a standalone system is subject to attacks by an end-user. A malicious user can probe the entire system unobserved, looking for weaknesses, and they can alter any part of it to exploit that weakness.

However, the world is better connected than ever before, and proliferation of the internet, cell phones, and wide-area and local-area network technologies means that very little is "standalone" anymore. It is becoming more common for systems that contain high-speed serial links between devices also to contain connections to the outside world. In a class of embodiments, the present invention employs connections to an external agent to prevent system users from setting or modifying usage rules, and to allow each device or subsystem that sets usage rules to be maintained in a controlled and more-easily defended environment. The product that a user buys or installs no longer makes usage decisions, but merely enforces them. While this may seem a subtle difference, the implications are extensive. First, there are fewer points in a product that must be kept secure, and those points can usually be buried deeper inside a chip or subsystem. Second, the architecture employed in accordance with the invention unifies content protection throughout the media distribution chain: where conventionally there are many different mechanisms (each protecting a different "layer"), there now can be a single mechanism (protecting all layers). Finally, the usage rules can adapt to meet the particular needs of the content provider or end-user, and this change can occur quickly and uniformly. This also extends the useful life of the content protection system (and hence the products that incorporate it) because it provides an upgrade path.

In a class of embodiments of the invention, a system that performs data encryption and decryption is not implemented as a standalone system comprising a transmitter, a receiver, and a link between the transmitter and receiver. Rather, at least one of the transmitter and receiver is connected to the outside world, and more specifically to an external agent (e.g., content authority 16 of FIG. 7). This agent performs one or more of a variety of functions which address the same kinds of problems faced in conventional "standalone" content protection systems, but in new and more effective ways and with verifiable audit functions built in to the architecture.

Note that the term "connected" is not used herein to denote "connected all the time" (continuously connected). In some embodiments, a transmitter (or receiver) is continuously connected to an external agent. However, in other embodiments neither the transmitter nor the receiver is connected continuously to an external agent. For example, connection to the external agent can occur at installation (or "registration") time, or it can occur whenever there is a change in the system, or at regular intervals, or with each use.

In a class of embodiments, the invention is a system having the architecture shown in FIG. 7. In preferred embodiments, the system has the architecture of FIG. 8 (which is a special case of the FIG. 7 architecture) and the content is protected by a hierarchy of content protection protocols. Content source 11 of FIG. 7 can be a satellite receiver, a DVD disk player, a source of encrypted video and audio data to be stored on a DVD disk, an audio or video server on the internet, or another source of encrypted data. Content receiver 15 is the final destination of the encrypted data, and is configured to decrypt the encrypted data that it receives. Receiver 15 can be a TV set, a portable MP3 player, an information kiosk, a printer, or another final destination for the received data. It should be appreciated that in some embodiments, the content is not video data (or other image data) and is decrypted but not viewed in receiver 15 (for example, the content can be audio data and receiver 15 can include circuitry for decrypting the audio data and a loudspeaker for playing a signal determined by the decrypted audio data).

Content authority 16 of FIG. 7 is an external agent of the type discussed above, and will be discussed in greater detail below. Content router 13 is coupled between content source 11 and receiver 15. In variations on the FIG. 7 system, content router 13 is omitted and encrypted data is delivered from content source 11 directly to receiver 15 rather than via router 13. In other variations on the FIG. 7 system, two or more content routers are coupled between source 11 and receiver 15, with the number of content routers depending on the distance and the structure found between the source and the receiver.

There are several different communication paths in the FIG. 7 system. Delivery path 21 (from content source 11 to router 13) and delivery path 22 (from content router 13 to receiver 15) are the routes used to transfer the actual encrypted content, and will typically be high-bandwidth connections although they need not be continuous connections. For example, delivery path 21 can be a DVD disk (in which case content router 13 is a DVD disk player) or an internet connection that downloads content overnight to content router 13 and then disconnects (in this case, content router 13 is a set-top box having capacity to store the downloaded data). Delivery path 22 can but need not be implemented using the same technology as delivery path 21. For example, in one specific case delivery path 21 is a satellite or cable or internet link, and delivery path 22 is a DVI link or other TMDS-like link. For another example, delivery path 21 is a serial ATA link, and delivery path 22 is a P1394 (FireWire) connection.

In many implementations of the FIG. 7 system, it is logical and practical to record or otherwise store the encrypted content at least one point along the distribution path (e.g., in at least one of source 11, router 13, receiver 15, and delivery paths 21 and 22). Preferably, the content protection protocol being used does not prevent temporary or permanent storage of the encrypted content, provides a mechanism that can be used to implement copy controls, and is capable of protecting the content while it is stored. For example, content source 11 (or router 13, or both source 11 and router 13) can include a hard-disk drive so that the content can be kept there in an encrypted and secure state until receiver 15 wishes to access it. A system having the FIG. 7 configuration can be implemented to protect the content from its assertion at the output of source 11 until its decryption by receiver 15, regardless of the structure that separates source 11 from receiver 15, and regardless of the structure or the time span that separates the source and final destination The "handshake" paths of the FIG. 7 system include handshake path A between content source 11 and content authority 16, handshake path B between content router 13 and content authority 16, and handshake path C between receiver 15 and content authority 16. Because the handshake messages will typically be small and transitory, the handshake paths can typically be implemented as simple and slow links. For example, the handshake paths can be implemented as internet (dial-up or otherwise) connections, telephone calls, email messages, bar-code scans, password entries, smart-card transactions, $I^2C$ or USB interfaces, or some combination of these and others. The handshake paths need not be real-time or continuous. The information transfer over each handshake path can occur once or occasionally, and the results can be stored for later use. The FIG. 7 system can be capable of several different modes of operation, depending on the content and the use.

In preferred embodiments, both handshake paths A and C are required and will always be present, and optionally handshake path B is also present. However, paths A and C (or A, B, and C) need not be separate. For example, all direct communication with content authority 16 can be through one of units 11, 13, and 15 (with the other units communicating indirectly with content authority 16), if provision is made in the communication scheme to prevent outside interference with indirect communication between any of units 11, 13, and 15 and content authority 16. Although a transaction to be implemented over handshake paths A and C can be initiated by either source 11 or receiver 15, both source 11 and receiver 15 must ultimately synchronize their efforts to accomplish the handshake transaction. Handshake path B is required in some implementations of the FIG. 7 system (e.g., those in which router 13 translates or otherwise changes the data in some way) but not in other implementations of the FIG. 7 system (e.g., those in which router 13 merely forwards the data it receives without translating or changing the data in any way).

If router 13 a "forwarding router" (a router whose function is merely to forward content without otherwise processing the content in any way) then router 13 need not know what the content is, should not be provided with the key required for altering or reading the content, and should be prevented from substituting different content for that which it receives (e.g., by ensuring that the original content asserted from source 11 is securely "signed" by source 11). If router 13 is a forwarding router, then router 13 need not communicate with content authority 16 (although it could be implemented to do so, and this might be desirable in some cases). In some implementations of the FIG. 7 system, content router 13 is an internet router which functions by examining the address of each received packet of encrypted data and sending the data on in the right direction. In all implementations in which router 13 is a forwarding router, router 13 should be configured to ensure that the forwarded data remain encrypted and safe, and the system is preferably configured to be capable of detecting any loss by router 13 of the data asserted thereto and to take corrective action in the event of such loss.

In a class of preferred embodiments, router 13 is a "translating" router which decrypts the encrypted data it receives, processes the decrypted data in some way, and then re-encrypts the processed data (and optionally also performing additional re-packaging of the processed data) and sends it to the next device in the delivery path chain (which could be receiver 15, or another router). In order to perform such operations, the translating router can communicate with content authority 16, for example to obtain two keys (one key for decrypting the data, and another for re-encrypting the data) or one key (for decrypting and re-encrypting data). Since the translating router must process the content in its vulnerable (decrypted) state, the translating router must be a trusted device. Consider the specific case that router 13 is a translating router implemented as a set-top box, delivery path 21 is a satellite link, and delivery path 22 is a TMDS-like link (e.g., a TMDS or DVI link). The satellite link typically transmits compressed audio and video on many channels, whereas the TMDS-like link typically transmits a single channel of non-compressed video (and perhaps audio). The set-top box includes a decoder that translates data (e.g., by expanding it, such as from MPEG2 compressed form to non-compressed form) from one selected channel of the satellite link into the necessary format for transmission over the TMDS-like link. The set-top box could also perform other processing on the data (in addition to expansion). For example, the set-top box could scale the picture to a different size (or aspect ratio) or add text overlays for instructions or programming guides. In order to perform any of these operations, the translating router would first decrypt the encrypted data from delivery path 21, then process the decrypted data, and then re-encrypt the processed data.

Content router 13, when implemented as a translating router, would typically be similar in the following respects to a "repeater" as defined in the HDCP protocol: in typical implementations both the translating router and the HDCP repeater would have more than one upstream port and more than one downstream port; and in typical implementations both the translating router and the HDCP repeater would be capable of processing an input at one upstream port and then copying the processed input to multiple downstream ports (outputs); and in typical implementations both the translating router and the HDCP repeater would be capable of processing multiple inputs (received at multiple upstream ports) and directing each processed input to one or more of at least two downstream ports.

There are no special security requirements on any of the delivery paths and handshake paths in the FIG. 7 system. Messages transmitted via any of the paths can be encrypted or digitally "signed" (e.g., using well-known, well-tested cryptographic techniques). Generally speaking, public-key (asymmetric) protocols can be employed to protect data (including exchanged keys) transmitted over the handshake paths. Specific examples of asymmetric protocols include the RSA and PGP protocols. More efficient (symmetric) encryption protocols are preferably used to protect the data transmitted in bulk over the delivery paths. The handshake mechanisms can be used to securely deliver the keys needed to encrypt and decrypt the data transmitted over the delivery paths.

In a system having the FIG. 7 architecture, the handshake paths are typically used to establish the data paths, and to provide the information necessary to cryptographically protect them. Assume that a consumer has subscribed to a service that lets him or her download movies through a fast internet connection for viewing in the consumer's living room. In a class of embodiments, a movie delivery transaction proceeds as follows:

the consumer sends either a request to view the movie, or a request to purchase a ticket to view the movie, to content authority 16 (e.g., by causing receiver 15 to send the request to content authority 16 over handshake path C). The request contains information about the content requested and the requestor, and typically also about the requestor's equipment capabilities;

the request is received by content authority 16, and something or someone processes the request. In some embodiments, content authority 16 processes the request, but in other embodiments some other device (e.g., content source 11, using information provided to it by content authority 16), system, or person processes the request. The entity that processes the request depends on the business model, infrastructure, and other features of the relevant implementation of FIG. 7. Preferably, in each case, content authority 16 uses cryptographic techniques to verify the content and origin of the request (regardless of which entity rejects, approves, or conditionally approves the request); and if the request is approved, content source 11 is informed of the approved request (preferably via handshake path "A"), unless content source 11 has itself processed the request. In response to being informed of an approved request, content source 11 uses information regarding the receiver (e.g., information received over handshake path "A" from content authority 16) to select the content, attach any qualifications to it, encrypt it, and send a packaged version of the requested content to receiver 15. The format of the packaged content (and the packaging) depends at least in part on specific information about the receiver. For example, the packaged content is encrypted using a public key associated with (e.g., allocated to) receiver 15 so that receiver 15 can use a private key (e.g., a private key stored in receiver 15) to decrypt it, or the packaged content is encrypted in accordance with a symmetric protocol and includes sufficient information to allow receiver 15 to generate, look up, or otherwise obtain the necessary key for decrypting the content, or the packaged content is encrypted in a manner that requires a session key (that varies from one transaction to the next) in order to decrypt it.

Content source 11 can custom-tailor the requested content for delivery to receiver 15, in a manner determined by information that is either explicit or implicit in the receiver's request. For example, the content might be delivered without commercials to premium customers, or with specific kinds of commercials for specific kinds of customers. High definition versions could be made available, or versions dubbed in other languages, or versions edited for television (toned down), or "original and uncut." If content source 11 delivers a "pre-packaged" and pre-encrypted version of the content, content source 11 will not be able to use the receiver's public-key to encrypt the content, but will have to provide the necessary key to the receiver to allow the receiver to decrypt the pre-encrypted content (such as by transmitting an encrypted version of such key to the receiver) or the receiver must otherwise be enabled to decrypt the pre-encrypted content.

Once the content is packaged, receiver 15 may need additional information in order to open and decrypt it. Generally speaking, this information includes an entire key or information that determines a key. Content authority 16 can be the middleman in an exchange in which the additional information is provided to receiver 15 (e.g., by source 11), or content authority 16 can merely give receiver 15 enough information to verify the digital signatures of the source of the additional information. A public-key protocol can typically be used to secure the exchange of the additional information.

Content source 11 delivers the packaged content to receiver 15. The packaged content is safe from eavesdropping or tampering. It could still be re-routed, lost, or otherwise hijacked, but if so it need only be sent again.

If there is at least one translating router in the delivery path (e.g., if router 13 is present as shown in FIG. 7 and implemented as a translating router), the movie (or other program) delivery transaction flow is as described above, except that the above-described operations typically occur twice: once for delivery to the translating router; and once for delivery from the translating router to the receiver. In some cases, at least some or of the above-described operations do not occur twice. Rather, one device (e.g., the translating router) performs on operation not only for itself but also on behalf of another device (e.g., the translating router sends ticket requests on behalf of itself and receiver 15 to content authority 16, content authority 16 either rejects or grants the requests, and when content authority 16 grants the requests, it sends appropriate tickets to the translating router, which then keeps its own ticket and forwards the other ticket to receiver 15.

In a class of embodiments, the invention is a system having the architecture shown in FIG. 7 (or variation on such architecture), with the delivery path including at least one TMDS-like link (e.g., an implementation of the FIG. 7 system in which delivery paths 21 and 22 are each implemented as a TMDS-like link). Each such system includes at least one transmitter (e.g., content source 11 of FIG. 7), at least one receiver (e.g., receiver 15 of FIG. 7), at least one TMDS-like link between the transmitter and receiver (e.g., delivery paths 21 and 22 of FIG. 7, at least one of which being implemented as a TMDS-like link), and an external agent (e.g., content authority 16 of FIG. 7). In preferred embodiments, the external agent provides at least one key (a sequence of keys, in some such embodiments) to each of at least one of the receiver and transmitter. Use of an external agent for key provision allows the system to operate using more keys, to change keys more frequently, and to limit keys either in scope (e.g., allowable use) or in time (with an expiration date) or in some other way (e.g., for a particular person or family). The system optionally includes one or more routers (e.g., router 13 of FIG. 7), any of which can but need not be a translating router, and at least one of which is coupled to the transmitter or receiver by a TMDS-like link. In preferred embodiments, the key distribution is accomplished in a refined manner to allow for very strong cryptographic security, and to support encryption at the high data rates required for fast digital connections. The external agent can perform one or more of the following functions (in addition to or instead of the noted key distribution function):

verify the identity of at least one of the receiver and transmitter by examination of a cryptographically secure digital signature;

generate key material for use by at least one of the transmitter and receiver in an encryption or decryption process. The key length can vary on-the-fly, for example to suit the needs of the application or to satisfy export control requirements. The key value can also vary on an as-needed basis, and can contain qualifiers (such as expiration dates, expected uses, copy permissions, or specific contents);

maintain a revocation list (or other database) which identifies devices that are not authorized to perform encryption or decryption. Thus, the revocation database is maintained in a central location (and optionally also in a small number of reflector locations) so that it is manageable (even if very large) and easily updated. The revocation database can also contain additional information, and is optionally implemented to revoke authorization of entire classes of devices (e.g., based on product make or model, date of manufacture, or other criteria) when appropriate;

maintain an audit trail of accesses and behaviors, and use this information to help improve overall system security. For example, the external agent can detect accesses that are too frequent, or that follow suspicious patterns, or that seem to show that one device ID is being simultaneously used in multiple locations; and perform some or all of the functions performed by a conventional certificate authority.

For example, in one implementation of FIG. 7, content authority 16 maintains and stores a revocation list, and source 11 and receiver 15 are configured to implement a content protection protocol and to initiate communication with content authority 16. Source 11 can initiate a communication exchange with content authority 16 in which content authority 16 checks a value (indicative of receiver 15, and asserted to content authority 16 by source 11) against the list, and causes source 11 to prevent successful completion of an authorization exchange with receiver 15 when the value matches an entry on the stored list. Alternatively, receiver 15 initiates an authorization exchange with content authority 16 in which content authority 16 checks a value indicative of receiver 15 (asserted to content authority 16 by receiver 15) against the list, and content authority 16 prevents receiver 15 from decrypting encrypted data from source 11 (or does not provide to receiver 15 a key or other value needed to allow receiver 15 to decrypt encrypted data from source 11) when the value matches an entry on the stored list. Source 11 and/or receiver 15 can communicate with content authority 16 via the internet, or by dial-up, or another suitable mechanism. Source 11 can be implemented so that it must cause content authority 16 to perform a check against the stored list whenever a new device (e.g., a second receiver coupled to router 13 by a third delivery path) is added to the system. In some embodiments, source 11 and content authority 16 are implemented so that source 11 causes content authority 16 to perform frequent checks (e.g., periodic checks performed frequently) against a revocation list, to verify whether any relevant value has been added to the revocation list since the last check. To impose a termination time for authorization of a first device, and to trigger frequent checking by content authority 16 of the eligibility of the first device (or one or more devices coupled directly or indirectly to the first device) to be authorized, an expiration date can be included in "token data" that determines a "token" that in turn enables or authorizes the first device (or another device coupled directly or indirectly to the first device). Such token data (having an expiration date) can be provided to the first device or another device coupled directly or indirectly thereto (e.g., to source 11) either by content authority 16 or another device or system, and the recipient of the token data can be configured to initiate or trigger the relevant check (by content authority 16) against the revocation list on (or at a predetermined time relative to) the expiration date.

While the noted functions of the external agent in systems having the FIG. 7 architecture all offer improvements over conventional protocols (such as conventional implementations of the HDCP protocol), the main advantage of use of an external agent in such a system comes from the overall system architecture. By nature, the receiver of a stand-alone content protection system (one not configured for communication with an external agent) is typically within the physical possession of a consumer. The consumer owns it, upgrades it, and sometimes opens and alters it (or downloads software patches for altering it). Such a conventional stand-alone system can easily be hacked, and its security is difficult to ensure. In contrast, an external agent is not within the possession or control of a consumer, and is instead typically under the control of a sophisticated organization with verifiable procedures and established legal responsibilities and obligations.

There is another major advantage of implementing a content protection system to have the architecture shown in FIG. 7. Stand-alone systems can provide content protection for data only within a limited range or application (e.g., the conventional HDCP protocol only protects data being transmitted from a transmitter to a receiver over a DVI link). Data outside of such limited range or application is either unprotected, or must be protected by some other mechanism (such as the CSS mechanism for encrypting video data that is stored on a DVD disc for playback using a DVD player, rather than transmitted over a DVI link to a receiver for display). This results in a hierarchy of content protection schemes, and the overall system is only as strong as the weakest content protection scheme. By implementing a content protection system embodying the invention to communicate with an external agent via one or more handshake paths distinct from delivery paths, it is possible to protect the data all the way from its source to its final destination using a single protocol (or a cohesive set of protocols), thus replacing, simplifying, or otherwise improving conventional content protection technology. Consider an example in which the source is in one state and the final destination is in another state or even another country. In this example, content protection of the data using a single protocol is possible using an external agent. In accordance with the invention, content delivery is a transaction that starts at one point, and ends at another point, and can pass securely through many hands in-between.

Figure 8:
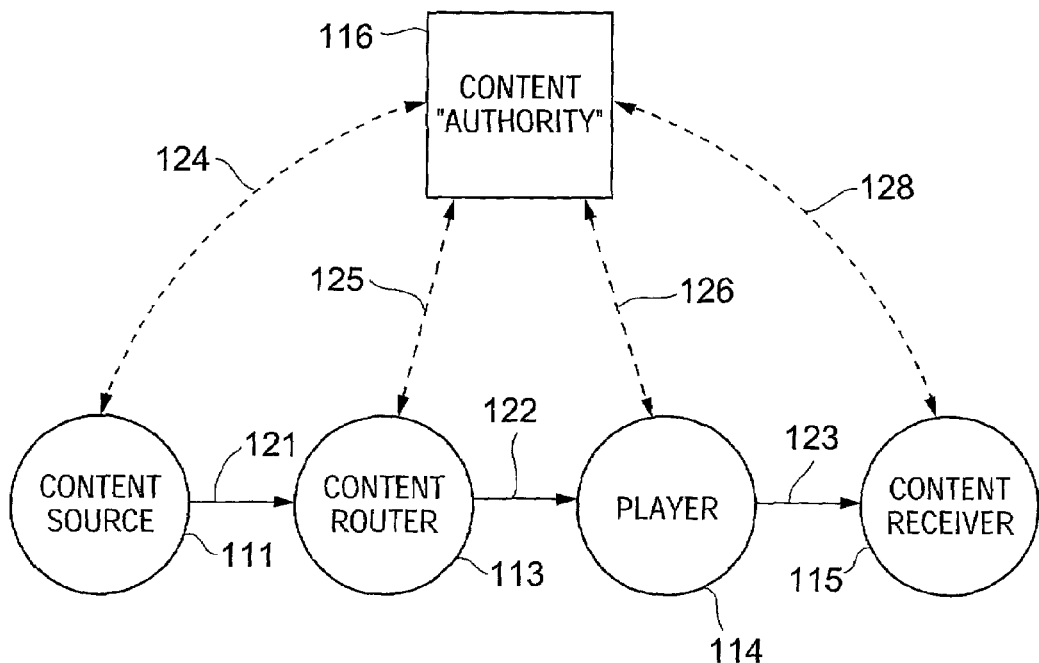
FIG. 8 is a block diagram of another system that can be implemented in accordance with the present invention (the architecture of the FIG. 8 system is a special case of the FIG. 7 architecture, in which units 114 and 115 correspond to a distributed implementation of unit 15 of FIG. 7, and the content transmitted from source 111 to unit 115 is protected by a hierarchy of content protection protocols).

In another class of embodiments, the inventive system has the architecture shown in FIG. 8, with delivery path 123 (between receiver 114 and receiver 115) implemented as a TMDS-like link. Content authority 116, content source 111, content router 113, delivery paths 121 and 122, and handshake paths 124, 125, and 126 of FIG. 8 correspond functionally to content authority 16, content source 11, content router 13, delivery paths 21 and 22, and handshake paths A, B, and C of FIG. 7. The architecture of the FIG. 8 system is a special case of the FIG. 7 architecture, in which units 114 and 115 correspond to a distributed implementation of receiver 15 of FIG. 7, and the content transmitted from source 111 to unit 115 is protected by a hierarchy of content protection protocols.

In FIG. 8, receiver 114 is a "player" as defined above (typically, but not necessarily, receiver 114 is a player that is a "repeater" as defined above). Receivers 114 and 115 collectively can be thought of as a "distributed receiver" comprising two separate units (114 and 115) coupled together by TMDS-like link 123. Typically, unit 115 is a decrypting display (as defined above), unit 114 is a set-top box distinct from the decrypting display, and link 123 carries video data in its simplest (uncompressed) form. Link 123 optionally also carries audio data and/or other non-video data. Some embodiments in the class to be described with reference to FIG. 8 include a distributed receiver comprising three or more serially connected units, where the units are "serially connected" in the sense that each intermediate one of the units has an input connected by a delivery path to an upstream one of the units and an output connected by another delivery path to a downstream one of the units, with at least one of the delivery paths within the distributed receiver being a TMDS-like link.

In variations on the embodiments having the FIG. 8 architecture, the invention is a system whose architecture is a variation on that of FIG. 8, with a TMDS-like link between at least one pair of the units of its distributed receiver. For example, in one such system, router 113 and delivery path 122 are omitted, and delivery path 121 connects source 111 directly with receiver 114. Other such system includes at least one additional router (a router in addition to router 113) connected along a chain of delivery paths between source 111 and receiver 115.

With reference to FIG. 8, typical embodiments of the inventive system employ the above-mentioned AES content protection protocol to encrypt data transmitted over paths 121 and 122 (and optionally also link 123). In some such embodiments, content source 111 sends encrypted, compressed data (e.g., video data) over path 121 (which can be a cable or satellite link, or another link) to router 113, and router 113 sends the encrypted, compressed data (or a processed and repackaged version thereof) over path 122 (which can also be a cable or satellite link, or another link) to receiver 114. At least one key (which can be included in a quantity of ticket data to be referred to as a "ticket") for use in decrypting the data is also transmitted to receiver 114 (by content authority 116, in preferred implementations). In typical implementation, receiver 114 uses each such key to decrypt the compressed data, and then expands the decrypted compressed data, re-encrypts the expanded data, and sends the re-encrypted, non-compressed data to receiver 115 via link 123. Receiver 115 also receives at least one key (which can be included in another ticket) for use in decrypting the data received from unit 114. In preferred implementations, content authority 116 sends each such key to receiver 115. Using each received key, receiver 115 decrypts the encrypted data received over link 123, and typically then displays the decrypted data (or plays it or otherwise uses it in some manner). In some implementations, receiver 114 receives one key for decrypting the data received over path 122, and both receivers 114 and 115 receive another key (for use by receiver 114 to encrypt the data to be transmitter over link 123, and by receiver 115 for decrypting the data it receives over link 123). There are many other implementations, including some in which more than one key is transmitted in one ticket, others in which one key is transmitted in several tickets (with a different part of the key in each ticket), and so on.

Typically, each of receivers 114 and 115 sends a ticket request to content authority 116, over handshake paths 126 and 128, respectively. In response, content authority 116 either rejects the request, or grants the request. When content authority 1116 grants the request, it sends an appropriate ticket to the appropriate one of receivers 114 and 115. Alternatively, handshake path 128 is omitted, receiver 114 sends two ticket requests (one on behalf of itself, and another on behalf of receiver 115) to content authority 116 over handshake path 126, and content authority 116 either rejects or grants the requests. When content authority 116 grants the requests, it sends appropriate tickets to receiver 114, and receiver 114 keeps its own ticket and forwards the other ticket to receiver 115. Typically, each ticket request includes at least limited information about the capabilities of the receiver originating the request, at least to the extent that such capabilities can affect the decision as to whether to grant the request. For example, if the ticket request indicates that receiver 114 is a set-top box with capability to decrypt AES-encrypted data that it receives (e.g., over path 122) and then re-encrypt the data in accordance with a non-HDCP protocol and assert the re-encrypted data at a digital output, the content authority could allow receiver 114 access to some (but not all) types of content, and if the ticket request indicates that receiver 114 is a set-top box with capability to decrypt AES-encrypted data that it receives and then re-encrypt the data in accordance with the HDCP protocol and assert the HDCP-encrypted data at a digital output, the content authority could allow receiver 114 access to other types of content.

In some embodiments, the inventive system having the FIG. 8 architecture employs the "AES-128" version of the above-mentioned AES protocol to encrypt data transmitted over paths 121 and 122. The AES protocol is a symmetric content protection protocol in which a shared secret key must be available on both the transmitter side and receiver side. The AES-128 version uses a 128-bit key to generate a sequence of 128-keys (a key schedule), and encrypts (or decrypts) each block of data in a sequence of ten rounds using the keys of the key schedule. One mode of the AES-128 protocol is the ECB (Electronic Code Book) mode (sometimes referred to as "AES-128 ECB"). Another mode of the AES-128 protocol is the CBC (Cipher Block Chaining) mode (sometimes referred to as "AES-128 CBC"). Many embodiments of the invention are contemplated, including at least one embodiment that implements each mode of the AES-128 protocol (and each other version of the AES protocol).

When player 114 of the FIG. 8 system outputs video for display by receiver 115, player 114 preferably has a digital output (that asserts either decrypted digital video, digital video that has been re-encrypted by player 114 after being decrypted, or encrypted digital video that has been encrypted by a device upstream from player 114), and optionally also an analog output that asserts decrypted analog video to receiver 115, at least under one or more of the following limited circumstances:

the digital output is suitably difficult to reach or decode by an unauthorized user or device (e.g., the digital output is asserted at a timing controller interface to an LCD panel);

the digital output is suitably protected by an extension of the content protection protocol used to encrypt the data for transmission from source 111 to player 114 (the "primary" protocol). To implement such an extension of the primary protocol, player 114 would first decrypt the data it receives and then re-encrypt the data using an appropriate mechanism for assertion at its digital output. Player 114 can but need not translate the data in some way between these two operations. In some implementations, the two separate operations will trigger the need for two separate keys or key sequences (e.g., player 114 needs a first key to decrypt the data received on link 122, and receiver 115 needs a second key to decrypt the re-encrypted data received on link 123) and optionally also two separate identification values (one for each of player 114 and receiver 115) and two authentication exchanges (between content authority 116 and each of player 114 and receiver 115); and the digital output is suitably protected by a content protection protocol different than the primary protocol (e.g., player 114 re-encrypts decrypted digital video in accordance with the HDCP or DTCP protocol for transmission to receiver 115, where receiver 115 is a display device, after player 114 has decrypted AES-encrypted digital video received over link 122).

In some embodiments of the invention, player 114 re-encrypts decrypted data in accordance with a modified version of the HDCP protocol, in which player 114 and the intended recipient of the re-encrypted data (e.g., an implementation of receiver 115) obtain the shared secret value ("Km") directly or indirectly from an external agent (e.g., content authority 116). The re-encrypted data are decrypted by another device (e.g., receiver 115) in accordance with the same modified version of the HDCP protocol.

An implementation of player 114 with an analog video output but no digital video output is equivalent to a pure display device, and will not be further discussed.

If player 114 has an output that asserts unencrypted digital data (e.g., decrypted video data), potential attacks are possible in which the unencrypted digital data are tapped from such output. The strength or weakness of the content protection protocol employed becomes a moot point if it can be easily bypassed. Such attacks can be prevented from succeeding in accordance with the invention, as follows:

incorporate analog circuitry or other circuitry at the output of player 114 to detect tapping or other tampering. Such circuitry can include threshold detectors that look for unusual signal reflections, line impedance or capacitance values, or voltage levels; and/or use additional encryption and decryption on the data stream, to prevent assertion of unencrypted data at the receiver output. The new encryption function could be implemented in source 111 (or upstream from source 111), and the new decryption function could be implemented downstream from player 114 (e.g., in receiver 115 or downstream from receiver 115). Ideally, the extra encryption and decryption engines are more difficult to "tap", either because each is somehow integrated, or because it is far-removed (e.g., at the remote end of an internet connection).

It is often useful to think of units 114 and 115 of FIG. 8 together (or receiver 15 of FIG. 7) as a cohesive unit (a single "receiver"), with all the electronics (typically including a display) integrated into this unit. However, a typical consumer electronics implementation, devices 114 and 115 are (or receiver 15 includes) two or more separate units (e.g., at least one "set-top box" and a display device) coupled together by interconnects, and these units function as a "distributed receiver." Typically, a link between set-top box and display in a distributed receiver carries video in its simplest (uncompressed) form. In choosing a content protection protocol (or set of content protection protocols) for a system that includes a distributed receiver (e.g., a system having the architecture shown in FIG. 7 or FIG. 8), it is important to ensure that suitable protection is provided for data transmitted between units of the distributed receiver (e.g., set-top box and display device), as well as data transmitted from the transmitter to the distributed receiver. Although a set-top box of a distributed receiver could be configured to forward encrypted data to another device for decryption (rather than to decrypt the data itself), this is an unlikely architecture and a trivial case that will not be discussed further herein.

Among the solutions to the general problem of providing security in a system including a distributed receiver are two categories of solutions: a first category in which a set-top box of the distributed receiver employs AES (e.g., AES-128) decryption and uses a "legacy" interface (implementing some other content protection protocol) to assert encrypted data to a display of the distributed receiver; and a second category in which AES content protection is employed both to protect the data transmitted to the set-top box and from the set-top box to the display. In either solution category, the distributed receiver can be implemented with multiple levels of AES content protection. For example, the distributed receiver can be a home theater system including multiple units (at least one set-top box, at least one display, and an AV receiver connected between at least one set-top box and a display) that receives data that has been encrypted multiple times according to AES protocol by the content provider, decrypts the data once in one of the units in accordance with an AES protocol, and then further decrypts the data in a second one of the units in accordance with an AES protocol.

We first consider a distributed receiver having a set-top box that employs AES decryption to decrypt AES-encrypted data (from a transmitter), re-encrypts the data in accordance with a non-AES content protection protocol (e.g., the HDCP protocol), and asserts the re-encrypted data at digital outputs coupled to a DVI, TMDS, or other TMDS-like link for transmission over the link to a display device. The non-AES content protection protocol protects the digital outputs of the set-top box. However, the overall system including the content provider, distributed receiver, and content authority preferably allows the content provider to restrict or deny access (to some or all types of content) by set-top boxes having certain digital outputs (e.g., digital outputs for coupling to a display device via a DVI link) or operating (or capable of operating) in certain modes (e.g., a mode in which the HDCP protocol provides content protection between the set-top box and a display device). The use of the HDCP protocol for content protection between a set-top box and a display device does not preclude the alternative (or even simultaneous) use of other mechanisms (such as AES encryption) for content protection between the same set-top box and display device. For example, a set-top box can be implemented to be operable in any of several modes to protect the content asserted at its digital outputs (e.g., a mode using AES encryption, and another mode using HDCP encryption), for example to allow operation in any of the modes depending on factors such as the capabilities of the display to which the set-top box is coupled, the type of content, and so on.

We next consider a distributed receiver having a set-top box that employs AES decryption to decrypt AES-encrypted data (from a transmitter), and also employs AES content protection to protect data transmitted from the set-top box to a display device. In a class of preferred implementations, the set-top box employs the AES-128 CTR protocol (where "CTR" denotes the "counter" mode of the AES-128 protocol) to decrypt data from the transmitter and AES-128 CTR encryption to re-encrypt the data for transmission over a DVI link (or other TMDS-like link) to the display device, and the display device employs AES-128 CTR decryption to decrypt the data received over the link from the set-top box. Use of the AES-128 CTR protocol would allow streaming (pipelined) implementations. A ticket (or set of key data) used to decrypt data in the set-top box could have the same form as the ticket (or set of key data) used to decrypt data in the display device, and could be provided to both devices (and optionally decoded in each device) in the same way. In some embodiments, each ticket provides (or allows the relevant device to generate) the shared secret value (cipher key) used symmetrically in the AES-128 CTR encryption and decryption circuitry.

In embodiments in which the distributed receiver communicates with a content authority over a network (distinct from its link with the transmitter), the ticketing mechanism can be implemented over the network. For example, in some implementations each ticket is transmitted over the network from the content authority directly to the relevant unit of the distributed receiver. However, in other implementations it would be impractical or unfeasible to transmit each ticket over the network directly to the relevant unit of the distributed receiver. For example, in the case that the distributed receiver includes a set-top box (including AES encryption circuitry) having a network connection, and a television set (including AES decryption circuitry) coupled to the set-top box but not having a direct connection to the network, the only practical ticketing mechanism for the television set might be for the television set to include circuitry for propagating ticket requests "upstream" (e.g., from the television set via the set-top box to the transmitter, or from the television set via the set-top box and the network to the content authority) and circuitry for receiving ticket results propagated "downstream" (e.g., from the transmitter to the television set, either directly or via the set-top box, or from the content authority to the television set via the set-top box). By ensuring that a ticket for a downstream device (e.g., the television set) is never decrypted or inspected by an upstream device (e.g., the set-top box), security is maintained.

The AES-128 CTR mode of the AES-128 protocol is a symmetric block cipher in which each iteration of the block (in which one 128-bit block of input data is processed) produces 128 bits of output data. 128 bits of output data can determine five encrypted (or decrypted) RGB pixels (each comprising 24 bits) plus one extra byte. The extra byte can be indicative of synchronization signatures and/or auxiliary data. To encrypt (or decrypt) a 128-bit block of input data, AES-128 essentially requires 40 operations (10 rounds of 4 steps each). To produce the necessary data rate for encrypting or decrypting video data, the AES engine would need to be pipelined, or multiple AES engines would need to be implemented in parallel, or the AES engine would need to be clocked at a very high rate, or some combination of approaches would need to be implemented. Regardless of its design, when using an AES engine (or multiple AES engines in parallel) for video decryption or encryption, the AES engine (or engines) should be implemented to be capable of completing an average of one iteration (to decrypt or encrypt one 128-bit block of data) every five pixel clocks.

Figure 9:
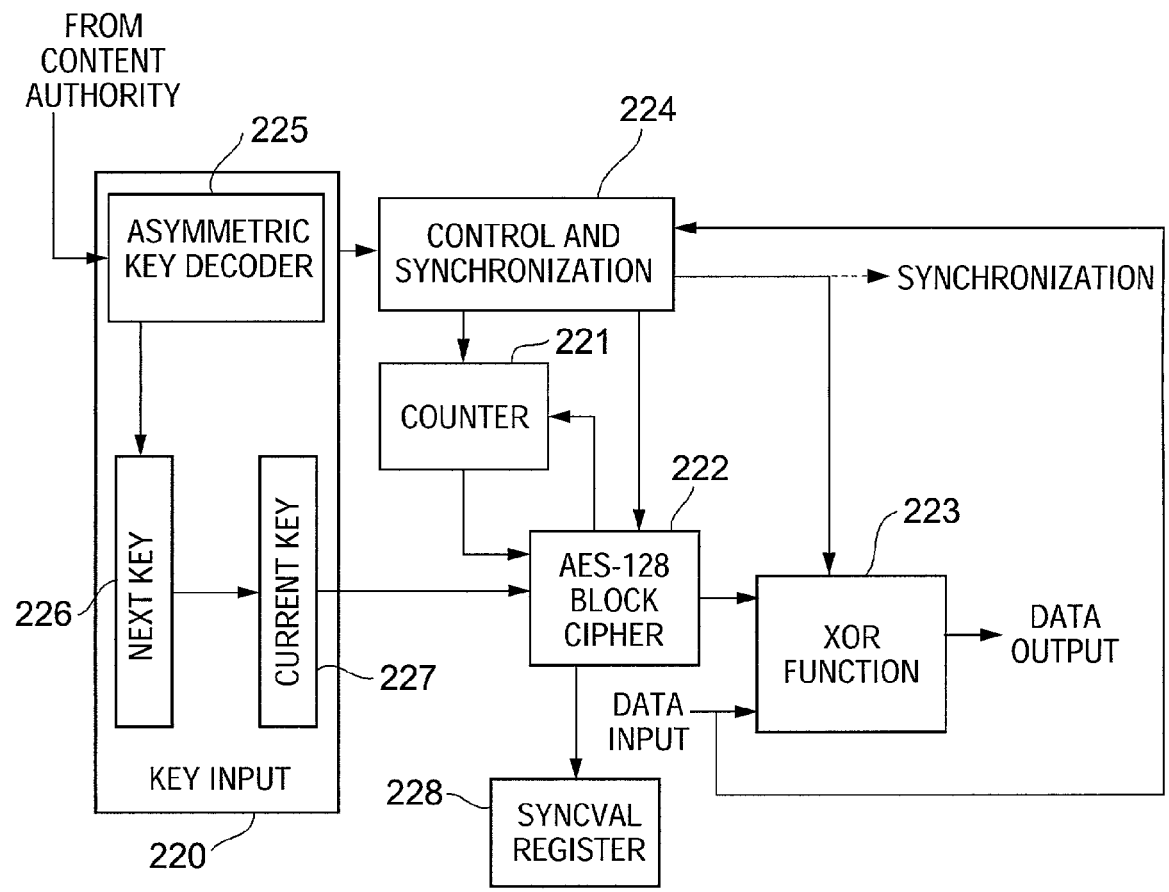
FIG. 9 is a block diagram of a cipher engine implemented in accordance with the present invention.

With reference to FIG. 9, we next describe an embodiment of a cipher engine configured to decrypt (or encrypt) video data using the AES-128 CTR mode of the AES-128 protocol. A cipher engine having the basic structure shown in FIG. 9 can be implemented in each of units 114 and 115 of FIG. 8, although the implementation in the upstream device (player 114) will typically be slightly different (in a manner discussed below) than the implementation in the downstream device (receiver 115) to suit operational requirements. The cipher engine of FIG. 9 has five essential elements: key input unit 220, counter circuitry 221 (including a count value register), block cipher 222, XOR circuitry 223, and control and synchronization unit 224. The FIG. 9 cipher engine combines a symmetric key system (for efficiency) with an asymmetric key system (for security).

Counter circuitry 221 and block cipher 222 together form a Pseudo-Random Number Generator or PRNG (an example of the PRNG of FIG. 6) that is used to create a sequence of "one-time pads" that are used to encrypt or decrypt the data input to XOR circuitry 223. This works because the PRNG functions in the cipher engines at the upstream and downstream ends of the link are synchronized in such a way that they provide exactly the same sequence at the same time. This sequence is determined by a complex function that depends on several variables. Some of these variables should be kept strictly secret, and without them it would be exceedingly difficult for any non-participant to deduce the sequence.

The overall strength of the cipher engine of FIG. 9 (and therefore of the link to which it is coupled) is bounded by the weakest element. In order to ensure the best possible security, it is important to adhere to the following guidelines:

- the upstream device (e.g., player 114) is ultimately responsible for the content delivered to it. It should monitor the link (e.g., a TMDS-like link between receivers 114 and 115) over which it sends encrypted video data, and shut down the video stream if trouble develops;
- secret values must be kept secret, and must be secure against electronic and physical attacks;
- "keys" must not be re-used. For example, a $K_L$ and count value combination should not recur;
- "keys" should be changed on a regular basis to limit the damage should any be exposed; and
- vulnerability to attacks in which the attacker asserts known input data to the cipher engine ("known-text" opportunities) must be limited where possible.

The cipher engines at both sides of each link must use the same key for encrypting and decrypting the data. This symmetric key approach is necessary because of the high data rates associated with video data transmission, but requires that all cipher engines involved must somehow exchange this value. Typically that means that the key is either transmitted, or simultaneously deduced. In either case, the overall security of the system is only as good as the security of the key exchange mechanism.

The cipher engine of FIG. 9 operates using transmitted keys, and the content authority is the ultimate source of these keys. To protect the keys in transit (to key input unit 220 of the cipher engine), the keys are themselves encrypted using an asymmetric key system. While cumbersome and too inefficient for the video stream, the asymmetric encryption approach is ideal for transferring small amounts of data (e.g., data determining keys) with very high security.

Key input unit 220 of FIG. 9 comprises asymmetric key decoder 225, which receives key messages (e.g., from the content authority), decodes and validates them, and extracts the key data from the decoded key messages. Each key message is composed of two parts: the key itself ($K_L$), and a Key Sequence Code (KSC). Each key must be carefully protected inside the cipher engine, and must not be readable or deducible in any way. However, the KSC values need not be protected, and the cipher engine can be configured to allow the KSC values to be read. Each KSC value is a "label" that identifies a corresponding key. The association between the KSC value and key is at the discretion of the content authority, but the KSC specifically must not be derived from $K_L$ in any way, so that it cannot be used to learn anything about the contents of the key. The KSC remains with the key in the cipher engine, so that at any time the KSC can be accessed to verify that the proper key is in the expected place. In alternative embodiments, key input unit 220 does not include an asymmetric key decoder, and instead such a key decoder is included in the receiver in which the cipher engine is implemented, and both the cipher engine and other circuitry within the receiver share the key decoder.

Although the KSC value can be transmitted to the cipher engine in an unencrypted (clear) state, a copy of the KSC value is preferably also contained in the encrypted portion of the key message asserted to the cipher engine. This provides additional verification and tamper resistance.

Key input unit 220 tracks two $K_L$ values (with the two corresponding KSC values) at all times: the "current" key (including the $K_L$ value currently in use in block cipher 222) in register 227; and the "next" key (including the $K_L$ value that will be switched into use at some specific moment in the future) in register 226. This double-buffering structure allows unit 220 to update, decode and verify a new key (held, or to be held, in register 226) without imposing strict time constraints on such updating, decoding and verification (i.e., while operating block cipher 222 in response to the key held in register 227), and thus improves flexibility and lowers cost.

The $K_L$ values are not specifically and exclusively tied to any particular content. This is an important feature of the invention. If the video stream being input to one of the cipher engines changes for any reason, the cipher engine does not need to wait for a new $K_L$ value to be delivered. The current $K_L$ value will continue to work, and will continue to be secure, until it is replaced by a new key $K_L$ value. This decouples the key delivery and the content delivery chains, and prevents one from being a bottleneck for the other.

The cipher engine can be implemented so that two specific KSC values (each a multi-bit word) have special meaning:

a KSC value consisting entirely of "1" bits in register 227 (or 226) indicates that there is no corresponding $K_L$ value in unit the register. When a $K_L$ value in register 227 is asserted to block cipher 222, unit 220 can transfer the $K_L$ and KSC values in register 226 to register 227, and set the KSC value in register 226 to consist entirely of "1" bits. This allows a receiver (in which the cipher engine is included) to determine when register 226 is able to accept a new key; and a KSC value consisting entirely of "0" bits (KSC=0) in register 227 indicates that the cipher engine does not alter the incoming video stream (i.e., XOR unit 223 passes through the data at its input to its output without altering the data), regardless of the $K_L$ value in register 227. Preferably, block cipher 222 remains active at this time and the cipher engine continues functioning in all other respects, to allow clear video to be passed through when necessary, and also to enable various test modes. Table 2 (set forth below) provides more information about these KSC values.

Alternatively, one or more of these or other bit patterns of KSC values is (or are) employed to indicate that there is no corresponding $K_L$ value in unit register 227 or 226, to indicate that the cipher engine does not alter the incoming video stream data regardless of the $K_L$ value in register 227, or to convey some other specific meaning.

Asymmetric key decoder 225 does not use any cryptographic means to verify the source of new key material. The public key of decoder 225 is typically not widely known (and is kept by the content authority), but even if it becomes widely known this would not reduce security. It might be possible in the worst case to use a discovered public key to disrupt system operation (e.g., by delivering bogus encrypted $K_L$ values to a decoder), but that would not help to decrypt any true encrypted $K_L$ value sent by the content authority or to decrypt the content protected by any of the true $K_L$ values). Further, the scope of this disruption would be limited to the single user's domain.

Figure 12:
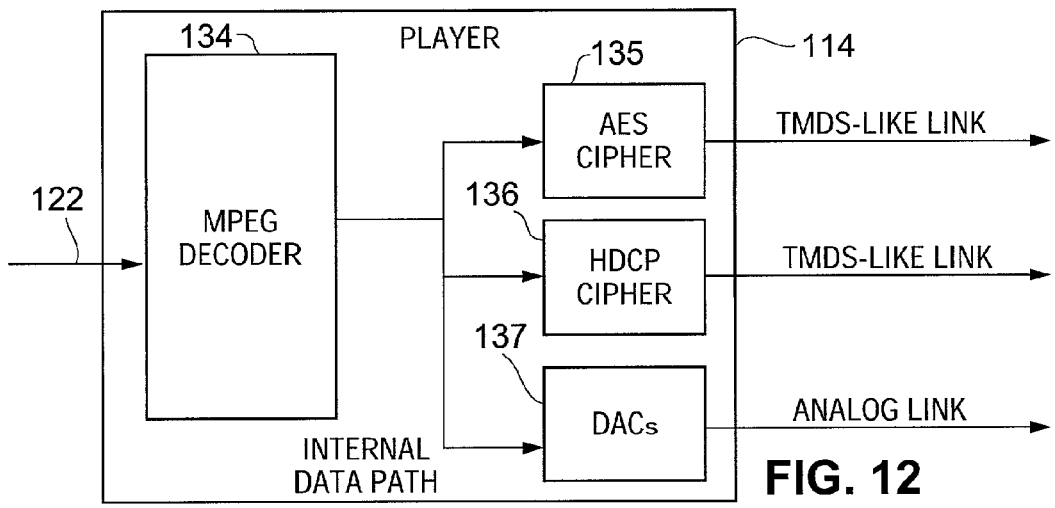
FIG. 12 is a block diagram of one embodiment of player 114 of FIG. 8, 9, or 11.

Since the KSC values can be used to switch cipher engines (of the type described with reference to FIG. 9) into modes in which they pass through data without altering the data, it is important to consider whether there are attacks that might use this to release protected content. Such attacks against a receiver of the type described with reference to FIG. 13 would fail, because the content received by such a receiver is still encrypted and protected at the source. However, a receiver of the type described with reference to FIG. 12 would be vulnerable to such attacks (e.g., if cipher engine 135, implemented as in FIG. 9, could be switched into a mode in which it passes through decrypted data from decoder 134), unless specifically designed to prevent such attacks from succeeding (e.g., when cipher engine 135 of FIG. 12 is in a non-encrypting mode, the FIG. 12 device must securely prevent protected content from being decrypted in decoder 134 and then reaching cipher engine 135).

With reference again to FIG. 9, counter circuitry 221 includes a 128-byte register that contains the next count value to be asserted to block cipher 222. In concert, counter circuitry 221 and block cipher 222 form a CTR Mode Pseudo-Random number generator. The CTR mode of AES-128 encryption is employed in preferred embodiments since it can be implemented by simple circuitry, and because its successive inputs will not be dependent on either the input data stream or the cipher outputs. This allows the block cipher to be implemented in a highly pipelined manner, which offers good speed, and prevents errors from cascading beyond their original location.

Table 1 shows a preferred format for the register of counter circuitry 221 (register 143 of FIG. 9A):

TABLE 1

Format of Counter Register 143

| Bits Allocated: | 64 [64 ... 127] | 32 [32 ... 63] | 16 [16 ... 31] | 16 [0 ... 15] |
|---|---|---|---|---|
| Definition: | Randomizer /OFB | Frame | Line | Pixel |
| Initialization value: (whenever a new key is switched in) | Pseudo-Random value produced by transmitter | 0 | 0 | 0 |
| Timing | 2nd Pixel Clock after leading edge of VSYNC | 2nd Pixel Clock after leading edge of VSYNC | 2nd Pixel Clock after leading edge of HSYNC | Each Pixel Clock |
| Operation: | Randomizer value before OFB operation, loaded with results of OFB thereafter. | 0 when the next key is loaded, then +1 for each encrypted frame | 0 at start of each frame, then +1 for each encrypted line | 0 at start of each line, then +1 for each encrypted pixel (after DE) |

This register is 128 bits long, and stores a count value having four fields. Three of these fields (a Pixel count, a Line count, and a Frame count) relate to video formats. They are included because there are certain error modes in which the cipher engines at each end of a link can count a different number of pixels or lines (one might get "ahead" or "behind"). Counter circuitry 221 is preferably implemented to resynchronize its counters on a line or frame boundary, which helps the encryption/decryption state-machines remain synchronized.

Figure 9A:
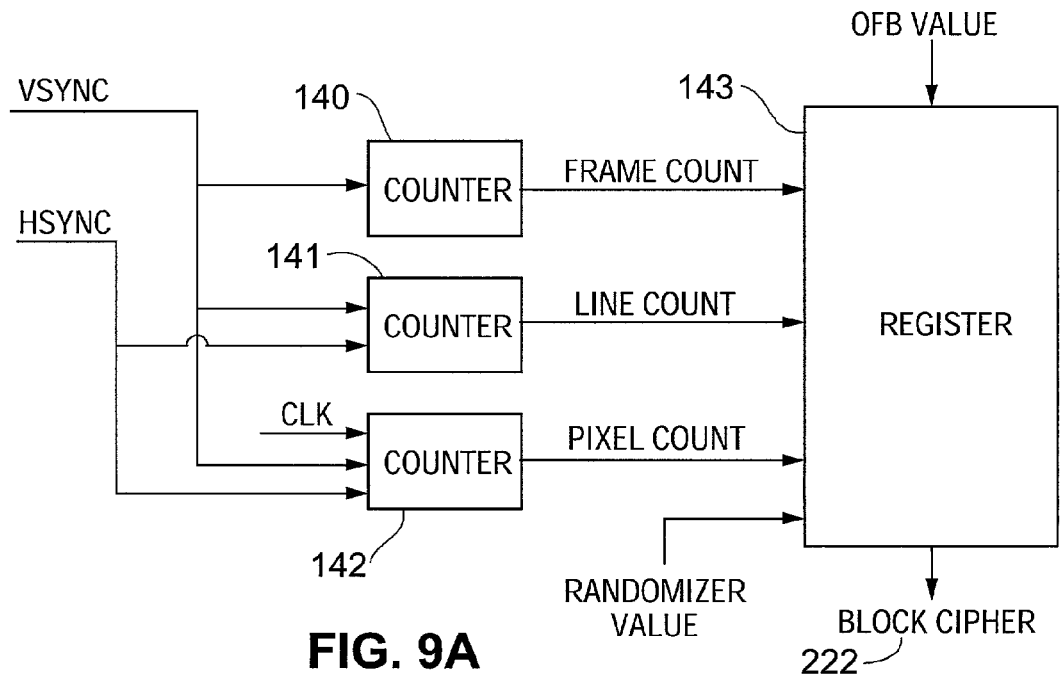
FIG. 9A is a block diagram of elements of an embodiment of counter circuitry 221 of FIG. 9.

More specifically, counter circuitry 221 is preferably implemented to include circuitry as shown in FIG. 9A that generates three counts: a frame count (number of Vsync pulses), a line count (number of Hsync pulses), and a pixel count. For example, the FIG. 9A circuitry includes counter 140 for generating the frame count in response to the vertical sync (Vsync) signal of the input video, counter 141 for generating the line count in response to the horizontal sync (Hsync) signal of the input video, and counter 142 for generating the pixel count in response to the pixel clock of the input video. The frame count, line count, and pixel count are written to register 143 and asserted from register 143 to block cipher 222 at the appropriate time. In response to each Hsync signal, counter 142 clears the pixel count. In response to each Vsync signal, counters 141 and 142 clear both the line count and the pixel count. In this way, the count values are re-synchronized at each sync pulse. The frame count is preferably a 32-bit value as shown in Table 1, to allow more than one year of continuous video encryption (or decryption) operation before the frame count will roll-over. Alternatively, the frame count is a 24-bit value to allow approximately three days of continuous video encryption (or decryption) operation before the frame count will roll-over. A roll-over of the frame count preferably triggers a break in the link in some manner, making it impossible for the system to re-use the same shared secret value for too long. Authorization to decrypt video (e.g., a ticket) should not be valid for longer than the frame count roll-over period. The line count is preferably a 16-bit value as shown in Table 1 (alternatively, it is a 12-bit value to accommodate resolutions with up to 4096 lines). The pixel count is preferably also a 16-bit value as shown in Table 1 (alternatively, it is a 12-bit value).

The fourth field of the count value stored in register 143 is a 64-bit randomizer/OFB field, which is updated to be a 64-bit "randomizer" value each time a new key is provided to the transmitter. Preferably, the randomizer value is a pseudo-random value. Also preferably, the randomizer value is generated by circuitry of the transmitter's cipher engine (e.g., control circuitry 224 of the cipher engine of FIG. 9, included in player 114 of FIG. 8 or another transmitter) each time a new key is provided to the transmitter (and thus each time that a new key is provided to the receiver). In alternative embodiments, the randomizer value is not a pseudo-random value. Each randomizer value is asserted to the randomizer field of the transmitter's register 143, and is asserted over a communication link to the receiver's cipher engine. Specifically, the transmitter (e.g., player 114 of FIG. 8) sends each randomizer value to register 143 of the receiver's cipher engine (e.g., the cipher engine of receiver 115 of FIG. 8), preferably through the challenge-response mechanism to be described below. Preferably, the randomizer value is updated only when a new key is provided to the transmitter, and in response to the randomizer field of each count value provided to block cipher 222 from register 143, block cipher 222 varies the decryption sequence each time a new key is switched in from unit 220, allowing limited re-use of previous keys.

The fourth field of the count value stored in register 143 is updated to be a 64-bit Output FeedBack ("OFB") value as a result of each OFB operation (to be described below). A specific cipher function using the OFB value is performed at each VSYNC interval, in a manner described below.

One important consideration is that the count value asserted by counter circuitry 221 to block cipher 222 should not be allowed to roll over (to a previous value) during assertion of a single $K_L$ value to block cipher 222. This is because such a roll over, is configured to include the pseudo-random value as a field of at least one of the count values would cause block cipher 222 to repeat the same sequence of values again to XOR unit 223, which would in turn reduce security. Therefore it is important to change the $K_L$ value on a regular basis. The frame and randomizer field widths determine the maximum time between changes of the $K_L$ value.

Since the pixel count (in register 143 of counter circuitry 221) is updated once per pixel clock cycle, and block cipher 222 accepts a new value from counter circuitry 221 only once per five pixel clock cycles, it will appear to block cipher 222 that the difference between successive pixel count values is five. Block cipher 222 will not see or use the intermediate pixel count values.

The maximum value of the pixel and line counts provides useful information about the video resolution in use. The rate of change of the frame count provides useful information about the refresh rate. It is contemplated that some of these counters could also be used to generate other useful signals (such as a data enable signal that indicates to the receiver whether active video is being transmitted).

We next describe block cipher 222 of FIG. 9 in greater detail. Because the FIG. 9 circuit implements the AES-128 CTR protocol, each key ($K_L$), and counter value (from counter circuitry 221) asserted to block cipher 222 consists of 128 bits. As a result of each AES operation (in which block cipher 223 generates a 128-bit pseudo-random output value in response to a 128-bit key and a 128-bit count value), block cipher 222 produces enough pseudo-random data to encrypt (or decrypt) 5.333 pixels of video data. Thus, in preferred embodiments, only enough of this data to encrypt (decrypt) five pixels is used, and the rest of the data (sufficient to encode an additional 0.333 pixel, corresponding to exactly one byte, called $R_c$) is not used for encryption or decryption so that data alignment remains constant.

The AES algorithm has four levels, and the AES-128 CTR algorithm specifies ten rounds for each of the four iterations (each "round" is a loop through the entire algorithm). Multiple rounds can be used to add more variability. Thus, block cipher 222 performs about forty steps all together for every five pixels encrypted (or decrypted), and if implemented in a fully pipelined manner, block cipher 222 performs two steps per pixel. It is assumed that each step requires one clock period. Therefore block cipher 222 could operate in response to a clock whose frequency is twice the pixel clock frequency, or could include duplicated logic (if it operates in response to a clock whose frequency is the pixel clock frequency). Both of those are expensive options. Thus, in a preferred, pipelined, implementation of block cipher 222, block cipher 222 uses only five rounds per iteration (i.e., five rounds to generate each 128-bit output value) during video streaming (and operates in response to a clock whose frequency is the pixel clock frequency), and at all other times block cipher uses the full ten rounds per iteration.

In response to the leading edge of each VSYNC signal, and after the non-OFB components of the count value in the register of counter circuitry 221 have been updated, block cipher 222 performs an OFB (Output Feedback) operation. This will spin the cipher exactly once (using the full number of rounds), and at least some of the bits of the resulting 128-bit block of data are used to further randomize the encryption data for the following frame. In a preferred implementation, the 64 least-significant bits of the 128-bit block (resulting from each OFB operation) are written to the "OFB" field of register 143 of counter circuitry 221, for use as input to block cipher 222 during processing of the rest of the frame. In the preferred implementation, the 32 most-significant bits of the 128-bit block (resulting from each OFB operation) are latched into SyncVal register 228 (shown in FIG. 9) if the Frame field in the counter (mod 256) equals zero. The contents of register 228 can be used to verify link integrity. For example, the system can be implemented to compare the contents of register 228 on each side of the link to determine whether they are equal to each other. If they are not equal to each other, the link is not operating properly. Typically, there are two synchronization bits associated with SyncVal register 228. One such synchronization bit is set whenever the SyncVal register is loaded and cleared (e.g., by software); the other synchronization bit is set on "overrun" errors of the first bit and cleared by software.

Of course, the FIG. 9 circuitry must know (or determine) the polarity of each VSYNC and HSYNC signal on which it relies during operation, so that it can recognize each leading edge of each VSYNC and HYNC signal as a rising or falling edge, whichever is correct.

The pipeline within block cipher 222 must be filled before block cipher 222 can assert data useful by XOR unit 223 for encrypting (or decrypting) video data, because it has a fixed latency and must assert useful data to XOR unit 223 by the time that unit 223 receives the first pixel of each quantity (e.g., each line) of video data to be encrypted. Block cipher 222 is "primed" (its pipeline is filled) during each interval from the leading edge of each HSYNC signal (when the pixel count asserted by counter circuitry 221 is cleared), except the first HSYNC signal after a VSYNC signal, to the leading edge of the active video following each such HSYNC signal. Since block cipher 222 performs the above-described OFB operation in response to each VSYNC signal (and may be performing such OFB operation when the first HSYNC signal after a VSYNC signal occurs), the priming operation following each VSYNC signal occurs after the count value (including the OFB field) in the register of counter circuitry 221 has been updated. Preferably, each priming operation uses the reduced number of rounds (five rounds to generate each 128-bit block of output data in response to one 128-bit key and one 128-bit count value), and thus must perform 20 steps to generate each 128-bit block of output data.

XOR unit 223 performs an Exclusive Or operation with the input video data stream as one input and the stream of pseudo-random values asserted by block cipher 222 as the other input, to encrypt (or decrypt) the input video data. The Exclusive Or function is used because it is easily reversible (it is its own inverse), and because it is value-neutral (it does not change the distribution characteristics of a pseudo-random stream).

In preferred implementations, the TMDS-like link between units 114 and 115 is synchronous, which means that the encryption operations at one end of the link and the decryption operations at the other end are essentially simultaneous. Proper data transmission can only occur if the two sides establish and maintain proper synchronization. A real-time reference is required for synchronous operation. This reference must retain its relationship to the data at each end, even if there is a small (but finite and constant) latency involved. Moreover, this reference must be readily distinguishable at each end of the link. The clock signal conventionally transmitted over a TMDS link is synchronous with the data transmitted over the TMDS link. (Strictly speaking, the clock signal transmitted over a TMDS link is a frequency reference only. It does not control or determine when the transmitted data are sampled, and each of the three data channels in the link must separately decide when to sample the data transmitted over such channel, for maximum skew tolerance.) Such a clock signal can be used as the real-time reference for synchronous encryption and decryption where appropriate, and it does mark the division between pixels, but it is not sufficient for this purpose in all cases. In some cases, the real-time reference value must enable the encryption (and decryption) circuitry on both sides of the link to begin or end an operation at a specific point in time.

As described, preferred implementations of the FIG. 9 circuitry use the first active video pixel in each line as a reference point. Typically, this reference point is signaled by the rising edge of a DE (data enable) signal, such as the DE signal conventionally provided to both sides of TMDS link for purposes other than for encryption or decryption of transmitted data. Of course, a TMDS-like link can transmit data in addition to encrypted video data, and thus may employ more than one DE signal (e.g., one DE signal for each type of data transmitted) that lead or follow the video data to be encrypted or decrypted. The encryption (or decryption) circuitry on both sides of a TMDS-like link should distinguish between all such DE signals, and identify the relevant transitions of the relevant DE signal which are to be employed as the real-time reference values for encryption (and decryption).

The position and width of the video synchronization signals employed by encryption and decryption circuitry on both sides of a synchronous TMDS-like link (in accordance with the invention) can vary slightly from one frame of video data to the next, due to synchronization errors and specifics of the TMDS-like link. The position and width of the video synchronization signals can also vary significantly in position and width from one video mode to another. Therefore these signals are not used as a critical timing references, but only for operations that have less critical timing. For example, the above-described OFB operation of counter circuitry 221 is triggered by a VSYNC signal and the above-described encryption "priming" of block cipher 222 is triggered by an HSYNC signal. Neither of these operations has critical timing requirements.

In typical embodiments of the inventive system, some encryption (or decryption) operations require a real-time synchronization signal that is less regular or less frequent than a video sync signal, yet still require precise synchronization. For example, transitions to new keys (e.g., $K_L$ values) occur only vary rarely (compared to the video pixel rate), and yet must take effect at both sides of the link at exactly the same pixel. In implementations of the inventive system that employ a TMDS link (e.g. link 123 of FIG. 8 implemented as a TMDS link), out-of-band words indicative of one or more of the four conventional control bits CTL0, CTL1, CTL2, and CTL3 mentioned above) can be employed to provide such "less frequently" occurring synchronization signals. For example, during each vertical blanking interval of a video signal, a sequence of out-of-band words (in turn indicative of a sequence of values of the bit CTL3) can determine the value of a synchronization signal. For example, control and synchronization circuitry 224 of FIG. 9 can be configured to determine the number of rising edge transitions of each such sequence of CTL3 values in the input video ("Data Input" in FIG. 9) during one predetermined line (e.g., the first line) of each vertical blanking interval and to determine a specific value of the synchronization signal from such number of edge transitions. As a more specific example, at least fourteen but not more than thirty rising edge transitions in the values of CTL3 in one line of a vertical blanking interval can indicate that the value of a "key change" synchronization signal is a logical "one" (which indicates to the receiver that the next frame of video is the last frame during which the "current" $K_L$ value will be used) and any number of rising edge transitions outside this range in the line can indicate that the value of the "key change" synchronization signal is a logical "zero." Preferably, each range of rising edge transitions (in the value of CTL3, in the example) that indicates a particular value of the synchronization signal is sufficiently broad to avoid transmission errors, because the out-of-band words that determine the CTL3 bits can experience glitches during transmission under rare circumstances, and this will cause the actual number of transitions seen to be different on both sides of the link.

For another example, control and synchronization circuitry 224 of FIG. 9 is configured to determine the number ("N") of rising edge transitions of each sequence of CTL3 values in the input video ("Data Input" in FIG. 9) during one predetermined line (e.g., the first line) of each vertical blanking interval, and to interpret such sequence of CTL3 values (having "N" rising edge transitions) as a synchronization signal whose value is a logical "one" (e.g., a "key change" synchronization signal whose value is a logical "one") in response to determining that N satisfies L<N<M, where L is an integer, M is an integer greater than L, (M−L)=kN, and k is a predetermined proportionality constant.

Many variations on the described embodiments are contemplated. For example, in some variations, a sequence of out-of-band words (in turn indicative of a sequence of values of the bit CTL2, or a sequence of values of some control bit other than CTL3) is asserted during each vertical blanking interval to determine the value of the synchronization signal.

In typical implementations in which AES-128 CTR encrypted video data are transmitted over a TMDS-like link, and decrypted at the other end of the link, the encryption and decryption need to be synchronous, and to occur simultaneously (so that the encrypted data can be decrypted for display without the need to use buffer memory capable of storing more than a small quantity of the encrypted data). The synchronization mechanism employed to maintain synchronization on the link should accomplish the following:

allow the count values (used by the AES-128 CTR block cipher) to be initialized to the same values on each side of the link;

choose the moment when encryption (and decryption) with a certain shared secret value is enabled; and verify that synchronization has been achieved and is currently maintained (to ensure that the link is operating properly).

In some embodiments (in which the link is a TMDS or DVI link), the first two of these functions are combined by causing each of the transmitter and receiver to respond to assertion of a control pulse (e.g., the CTL2 signal discussed above with reference to FIG. 1) by initializing the CTR mode counter circuitry of its cipher engine, and to commence encryption (or decryption) using the "next" shared secret value on the next rising edge of a DE (data enable) signal. Each of the CTL2 and DE signals can be transmitted over one of the link's video channels (e.g., one of Channel 0, Channel 1, and Channel 2 of FIG. 1).

As noted above with reference to FIG. 9, in order to solve the pipeline filling problem inherent with AES-128 CTR encryption and decryption of video data, the first AES iteration should be completed before the cipher engine begins to receive video data. Thus, the trailing edge of HSYNC can be used to start the first AES iteration in the block cipher (e.g., block cipher 222 of FIG. 9) of the cipher engine, and then the rest of the iterations are performed as necessary.

In order to reduce the cost of implementing AES encryption and decryption of video data transmitted over a TMDS, DVI, or TMDS-like link, fewer AES rounds (or fewer iterations, when using the output feedback mode of AES)

can be used to encrypt (or decrypt) all or some (e.g., most) of the pixels of each line of video. This allows less pipelining and/or lower frequencies of operation. The full number of rounds (or multiple iterations, such as when using the output feedback mode of AES) can be used for some time commencing during each horizontal blanking interval to introduce more randomness into the encryption process.

Preferably, the shared secret values (keys) used to implement AES encryption of video data are double buffered. After one key has been loaded into the cipher engine of one device (a receiver or transmitter), for example, into a register of the cipher engine, the device can receive or generate the next key (e.g., request and decode another ticket to learn the next key). The next key can be loaded into another register of the cipher engine. In preferred implementations, a portion of each ticket (e.g., a "verification" field or other portion of the ticket, such as the above-discussed KSC value) distinct from the secret key determined by the ticket, is employed by the system to verify that the shared secret key (that corresponds to such verification portion) is correct on each side of the link. The system should not be able to verify directly that the shared secret key on one side of the link matches that on the other side of the link because each side should keep the secret key confidential, but the system can perform such verification indirectly. The upstream device (transmitter) can be implemented to: read, at the appropriate time, from the downstream device (receiver) the verification portion of the ticket most recently received by the downstream device; and verify, using such verification portion (and typically also the verification portion of its own ticket), that the latest shared secret key in each of the upstream and downstream devices is correct.

Preferably, new tickets (that can be processed to determine shared secret key values) are distributed in the background, and each cipher engine switches the new shared secret key values (determined by the tickets) into use "on the fly." This allows keys to be changed on a regular basis during decryption and display of video data, without disrupting the visual experience. It also allows a transmitter and receiver to establish data transfer over a link in the first place, and to reestablish data transfer over the link if necessary and appropriate.

With reference again to FIG. 8, we next describe additional aspects of embodiments of the inventive system that have the architecture shown in FIG. 8 (or variations on such architecture), and in which delivery path 123 is a DVI link or other TMDS-like link. In such embodiments, the protected content transmitted via path 122 to player 114 is typically compressed in some way (such as by MPEG-2 compression), but the protected content transmitted by player 114 over link 123 to receiver 115 is normally uncompressed and thus has a higher data rate. Transmission over paths 121 and 122 is typically asynchronous (the data is packetized, and is decrypted at a different time, and possibly even at a different rate or in a different order, than it was encrypted). Typically, transmission over link 123 is synchronous, so that the data are transmitted in streaming fashion, and are encrypted and decrypted at a constant rate and at the same time (in practice there will be a small delay, but the latency is constant and small to minimize the buffering requirement and hence the cost of the associated hardware).

Figure 10:
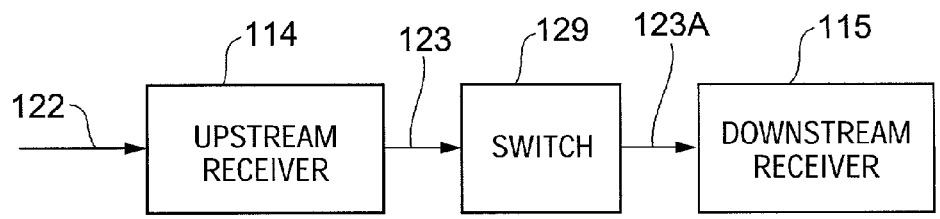
FIG. 10 is a block diagram of a portion of a variation on the FIG. 8 system.

Elements 114, 123, 129, 123A, and 115 of FIG. 10 replace elements 114, 123, and 115 of FIG. 8 in an embodiment of the inventive system whose architecture is a variant of the basic architecture of FIG. 8. In the FIG. 10 embodiment, switch 129 functions to buffer the link at the output of player 114, and optionally also to allow this link to be switched. Specifically, player 114 transmits encrypted data (e.g., encrypted video data) over TMDS-like link 123 to switch 129, and switch 129 forwards the same encrypted data to receiver 115 by transmitting the data over TMDS-like link 123A to receiver 115. Although links 123 and 123A are distinct TMDS-like links, in a logical sense, link 123A is merely an extension of link 123. Link 123A is electrically isolated from link 123 (this is necessary for proper operation of each as a TMDS link or other typical TMDS-like link), but each carries exactly the same data. Switch 129 is essentially transparent to units 114 and 115. Optionally, switch 129 has at least two inputs (including one which can be coupled to link 123 and another which can be coupled to another TMDS-like link, not shown) and/or at least two outputs (including one which can be coupled to link 123A and another which can be coupled to another TMDS-like link, not shown) and is configured to selectively forward data from any of the upstream links to all of the downstream links or to any selected one (or subset) of the downstream links. In variations on FIG. 10, switch 129 is integrated into either player 114 (e.g., to give it more output channels) or receiver 115 (e.g., to give it more input channels). In one implementation, switch 119 is an A/V receiver (implemented as a standalone device), player 114 is a set-top box, and receiver 115 is a television set.

Figure 11:
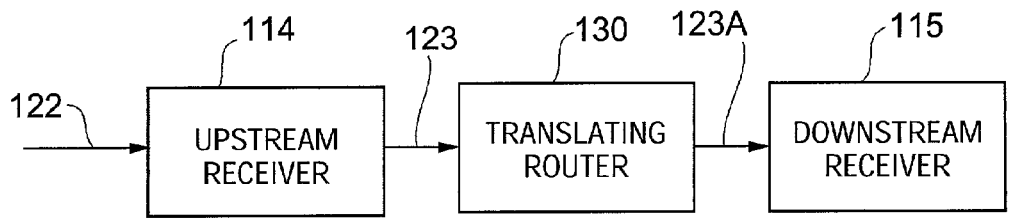
FIG. 11 is a block diagram of a portion of another variation on the FIG. 8 system.

Elements 114, 123, 130, 123A, and 115 of FIG. 11 replace elements 114, 123, and 115 of FIG. 8 in another embodiment of the inventive system whose architecture is a variant of the basic architecture of FIG. 8. In the FIG. 11 embodiment, translating router 130 functions not only to buffer the link between player 114 and receiver 115, but also to decrypt the data received over TMDS-like link 123 from player 114, to modify the decrypted data, and then to re-encrypt the modified data stream and transmit the re-encrypted, modified data over TMDS-like link 123A to receiver 115. In this case, not only is link 123A electrically isolated from link 123, but links 123 and 123A are distinct TMDS-like links in a logical sense. Therefore, translating router 130 cannot be transparent, and translating router 130 (as well as each of player 114 and receiver 115) must participate in a key exchange process when the data transmitted over links 123 and 123A are protected by symmetric key encryption. Translating router 130 will generally not be integrated into player 114 or receiver 115 because there is typically no practical benefit in doing so. Typically, translating router 130 is a standalone device. In one implementation, translating router 130 is an A/V receiver, player 114 is a set-top box, and receiver 115 is a television set.

In variations on the FIG. 10 and FIG. 11 embodiments, the inventive system includes two or more switches, two or more translating routers, or at least one switch and at least one translating router.

FIG. 12 is a block diagram of one embodiment of player 114 of FIG. 8, 9, or 11. The FIG. 12 embodiment includes MPEG decoder 134, which is coupled to receive compressed, encrypted data transmitted over path 122, and is configured to decode (expand and decrypt) the incoming data stream. The internal data path between the output of decoder 134 and the inputs of circuits 135, 136, and 137 carries uncompressed and unencrypted data (typically video data) and so must be physically protected within the device, and if possible within a single chip. The output of decoder 134 is coupled to DAC circuitry 137 (whose analog output is asserted either to an integrated display, or through a connector to the outside world), and to AES cipher engine 135 and HDCP cipher engine 136, and optionally also other digital connections providing content protection. AES cipher engine 135 re-encrypts the data in accordance with the AES protocol (e.g., the AES-128 CTR mode) and asserts the re-encrypted data to a TMDS-like link. HDCP cipher engine 136 re-encrypts the data in accordance with the HDCP protocol and asserts the re-encrypted data to a TMDS-like link (which can be the same link to which cipher engine 135 is coupled, or another TMDS-like link).

The receiver of FIG. 12 must identify its capabilities and current configuration when requesting a ticket (to enable it to decrypt the incoming data from path 122, and optionally also to allow it to re-encrypt the data in engine 135 or 136) from a content authority. This allows the content authority to make specific determinations about which rights will be granted, and which will not. For example, some content may not be allowed on certain outputs or in certain modes. Preferably, the receiver is configured so that it cannot switch between different outputs in mid-operation (e.g., so that when cipher engine 135 has begun to encrypt a stream of video data from decoder 134 or when DAC circuitry 137 has begun to perform digital-to-analog conversion on the stream, the receiver cannot begin to encrypt the stream in cipher engine 136 without authorization from a content authority). The receiver is ultimately responsible for the protected content delivered to it, and so is preferably required to manage all downstream connections accordingly.

FIG. 12 shows separate links at the outputs of elements 135 and 136. Optionally however, these links can share a common connector and electrical layer, with a single digital output handling either the AES or HDCP protocol (or both of them), depending on the capabilities of the device that receives the data from element 135 or 136. at the other end. The FIG. 12 receiver preferably supports "clear" (unencrypted) operation, in which (for example) cipher engine 135 or 136 passes through data from its input to its output without encrypting the data, for backwards compatibility and to display information while establishing or diagnosing one of the other modes. The FIG. 12 receiver should be configured so that it cannot switch from an encrypting operating mode to a "clear" operating mode without authorization from a content authority (e.g., without obtaining a new ticket).

Figure 13:
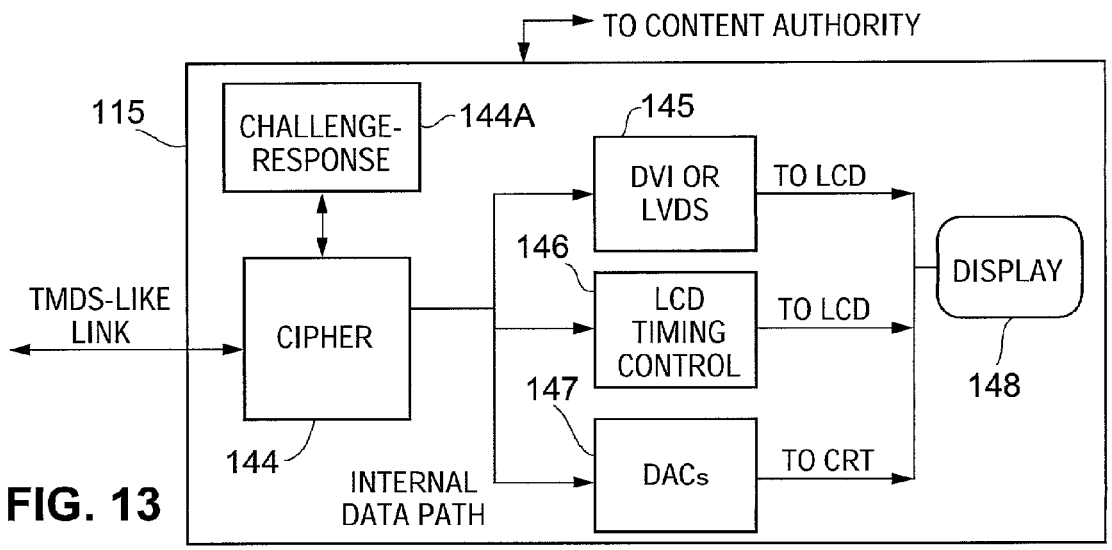
FIG. 13 is a block diagram of one embodiment of receiver 115 of FIG. 8, 9, or 11.

FIG. 13 is a block diagram of one embodiment of receiver 115 of FIG. 8, 9, or 11. The FIG. 13 embodiment has only one input (e.g., to be coupled to the TMDS-like link at the output of cipher engine 135 or 136 of FIG. 12) and has no outputs. The receiver of FIG. 13 should be integrated in such a way that its internal data paths are sufficiently protected (e.g., by physical barriers, such as the package of an integrated circuit implementation of the relevant circuitry). Cipher engine 144 receives and decrypts the data stream asserted to the receiver 115's input, and asserts the decrypted data to one of serial link 145 (which can be a DVI or LVDS link), LCD timing controller 146, and DAC circuitry 147. The output of element 145, 146, or 147 is coupled to display 148 which is integrated within receiver 115. If display device 148 is an LCD display, element 145 or 146 is coupled between the LCD display and the output of cipher engine 144. If display device 148 is a CRT display, element 147 is coupled between the CRT display and the output of cipher engine 144 to provide analog video to the CRT display. Since an LCD or CRT cannot be integrated into a chip with cipher engine 144, each of elements 144, 145, 146, and 147 is preferably implemented so that the output of the relevant one of element 145, 146, and 147 is difficult to record, interpret, or capture (e.g., because of signal bandwidth, unusual levels or timing relationships) and is not easily translated back to a usable video signal if captured.

Figure 14:
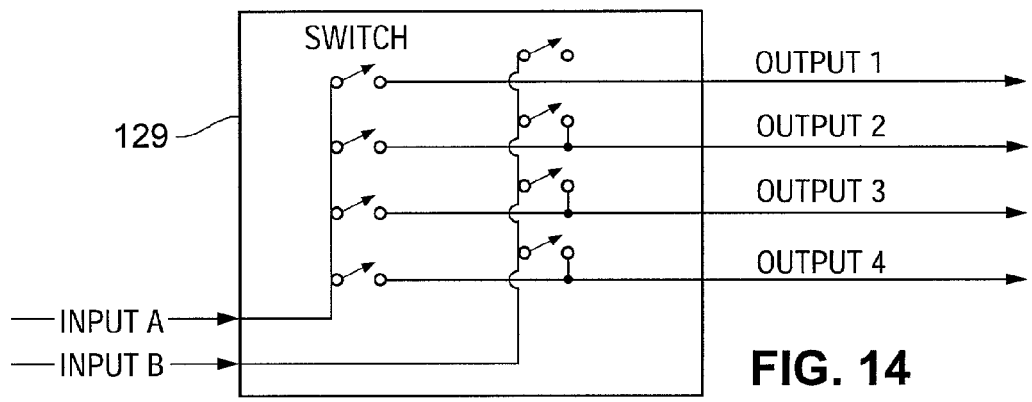
FIG. 14 is block diagram of one embodiment of switch 129 of FIG. 10.

FIG. 14 is a block diagram of one embodiment of switch 129 of FIG. 10 having inputs A and B (one of which can be coupled to path 123 of FIG. 10) and four outputs (one of which can be coupled to path 123A of FIG. 10). The FIG. 14 embodiment is essentially a cross-point switch that allows any of its inputs to be connected to any of its outputs. In variations on the embodiment shown, the switch has one input (or more than two inputs), and/or more than four (or less than four) outputs. Other variations on the embodiment shown include switches that are "ganged" subject to the following rules:

no two input ports may be connected together;
any output port may be connected to at most one input port at a time;
an input port may be connected to more than one output port;
an output port need not be connected to any input port. If it is not, the switch can either drive an informational display to the output port, or leave the output port neutral. The latter is typically preferable since it allows the corresponding display to power-down; and
whenever a TMDS link (or other multi-channel link) at an input port is connected to a TMDS link (or other multi-channel link) at an output port, the corresponding communication channels must always be connected together.

Figure 15:
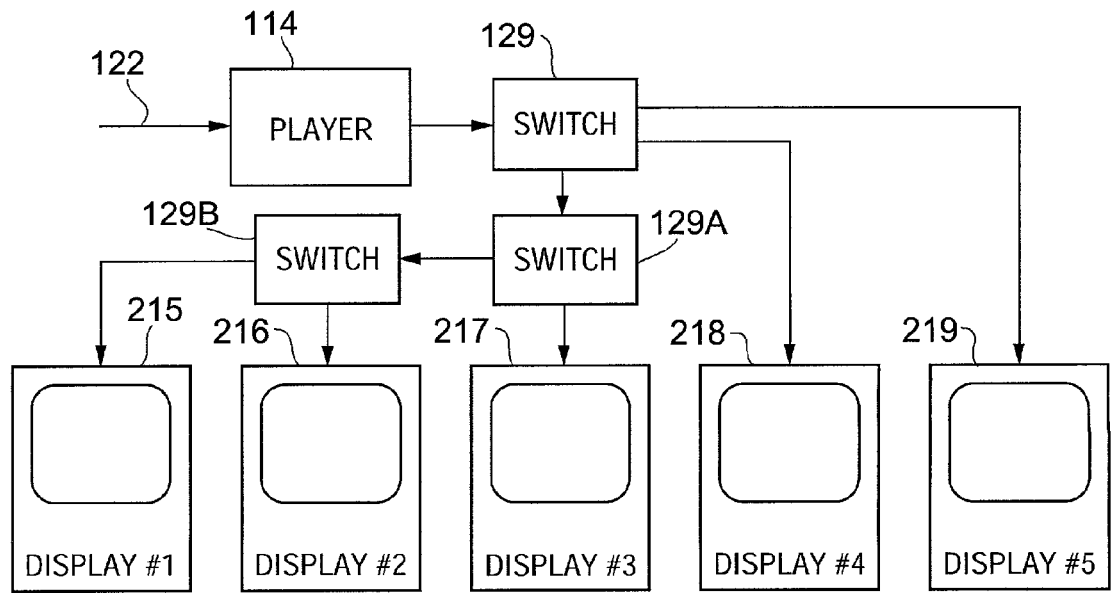
FIG. 15 is a block diagram of another system that can be implemented in accordance with the present invention.

Compliance with these rules results in an active system that can have an inverted "tree" structure, starting with exactly one player (e.g., player 114 of FIG. 10) and ending in one or more downstream devices (e.g., displays). FIG. 15 is a block diagram of one example of such a system, with three layers of switches. The FIG. 15 system comprises player 114 (coupled and configured to receive, decrypt, and re-encrypt data transmitted over path 122), switch 129 coupled to the output of player 114 and having three outputs (coupled to switch 129A and display devices 218 and 219), switch 129A having two outputs (coupled to switch 129B and display device 217), and switch 129B having two outputs (coupled to display devices 215 and 216). There may be several systems of the same general type as that of FIG. 15 in some real-world configurations. For example, the overall system could include another player (not shown) connected to a second input port of a modified version of switch 129, and such modified version of switch 120 could have additional outputs coupled directly (or indirectly through additional switches) to another set of display devices. Such a larger system would form another tree, intermingled with the tree shown in FIG. 15, and capable of exchanging "branches" with the tree of FIG. 15. Yet for the purposes of discussion, each tree can be considered to be either a separate system, or a portion of a larger system.

In preferred implementations in which the switches of the FIG. 15 system are transparent to the other system elements, the FIG. 15 system effectively has the same architecture as a system comprising a version of player 114 having five outputs (each directly connected to a different one of display devices 215-219) and one input (coupled to path 122).

Figure 16:
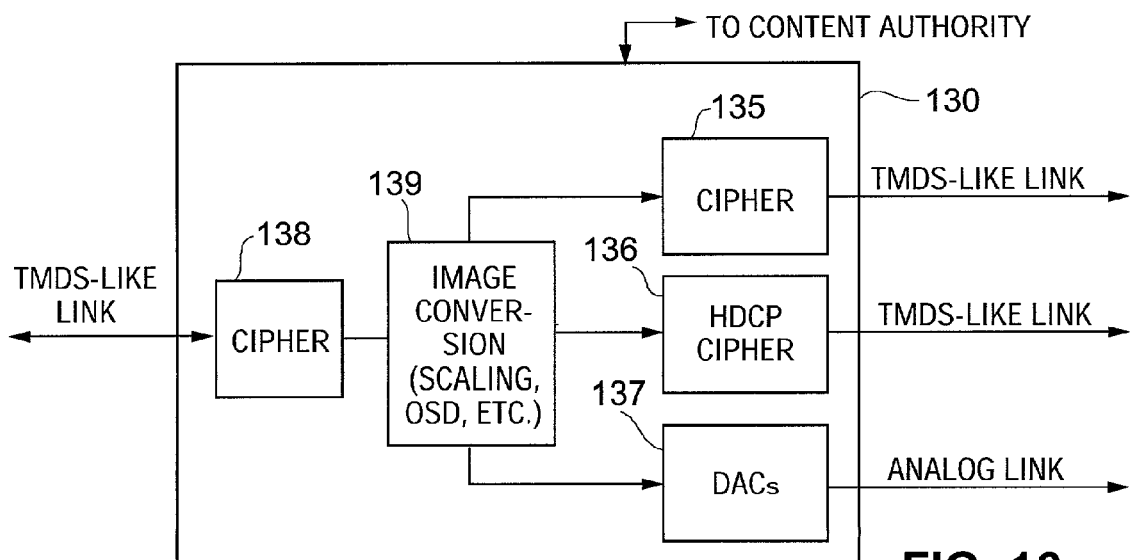
FIG. 16 is a block diagram of an embodiment of translating router 130 of FIG. 11.

FIG. 16 is a block diagram of an embodiment of translating router 130 of FIG. 11. Translating router 130 of FIG. 16 includes cipher engine 138 which is coupled to receive encrypted data transmitted from a TMDS-like link (e.g., path 123 of FIG. 11, implemented as a TMDS-like link) and configured to decrypt the incoming data stream. The output of cipher engine 138 is asserted to translation circuit 139, and the translated data output from circuit 139 are asserted to cipher engines 135 and 136, and optionally also other digital connections providing content protection, and to DAC circuitry 137. Engines 135 and 136, and DAC circuitry 137 are identical to the identically numbered circuits of FIG. 12 and the foregoing description of them will not be repeated. The internal data path between the output of cipher engine 138 and the inputs of circuits 135, 136, and 137 carries unencrypted data (typically video data) and so must be physically protected within the device, and if possible within a single chip. In different implementations, translation circuit 139 is configured to perform one or more of image scaling, format conversion, addition of an on-screen-display, interlaced-to-progressive format conversion, frame rate conversion, picture-in-picture processing, insertion or extraction of audio, or other operations on the data received from cipher engine 138.

Although not shown in FIG. 16, a switch (such as that of FIG. 14) can be integrated into at least one of the input and output ports of translating router 130. If such a switch is present, then the translating router should be implemented to follow the rules (set forth above) for implementing switches. However, a translating router is not transparent to a transmitter upstream therefrom, and thus each such transmitter must be aware of the translating router and the translating router must participate in a key exchange process with the transmitter.

In a system having the FIG. 8 architecture (with path 123 including a TMDS-like link for encrypted data transmission) and variations on such architecture, the system should provide a communication channel that allows player 114 and receiver 1115 to share status information and participate in the key exchange process (more generally, a communication channel that allows all transmitters, receivers, and translating routers connected along a tree, having player 114 as its root and including switches and paths in addition to path 123, to share status information and participate in the key exchange process). The exact nature of this communication channel will vary depending on the underlying nature of the TMDS-like link. The communication channel can be included in (and implemented by) the link or it can be implemented separately from the link. Preferably, the communication channel has the following characteristics:

- it must be able to individually address player 114, receiver 115, all other receivers in the currently configured tree, and all translating routers in the currently configured tree;
- it always provides a communication channel path that follows the protected content path;
- it must be able to (or include specific mechanisms to) detect and respond quickly to changes in the current configuration (and preferably includes "hotplug" capabilities);
- it must be able to detect and/or negotiate the capabilities and desired modes of all connected devices;
- it must have sufficient bandwidth to handle the necessary message traffic, including the messages (which can be relatively large) used for key exchange;
- it provides for transmission of status information, such as "error state", "authentication state", and so on; and
- it need not be perfectly reliable, if higher-level protocols verify proper receipt of a message and can cause retransmission if necessary. Nonetheless, it should be reliable enough that its unreliability does not pose an undue burden either on the channel's bandwidth, or on the higher-level protocol.

We next consider other aspects of systems having the FIG. 8 architecture (with path 123 including a TMDS-like link for encrypted data transmission) or a variation on such architecture.

If a pre-defined reset operation is needed for any specific application, it should be provided either internally within each receiver and transmitter or transmitted by the communication channel. It should not use or assume any specific relationship of the clock, synchronization, data, or control signals.

Prior to transmitting encrypted data, the transmitter preferably uses the communication channel to determine identification values for all devices in the current system, to determine the capabilities of each device, and then negotiate selected operating modes with all devices in the current system. The choice of mode can affect the permissions received from the content authority, and the final choice of mode will often be a compromise between what the user (the ultimate recipient of the protected content) wants, what the system prefers, and what the content authority allows.

The system is desirably operable in an "unencrypted" mode in which it sends unencrypted data, and in which all encryption and decryption circuitry is bypassed or disabled. It may be desirable to implement the system (or some or all of the transmitters and receivers thereof) to operate in such an unencrypted mode to ensure backwards compatibility with conventional devices, or to allow operation in a system initialization period (before valid keys are delivered), or to allow operation following a system failure (when proper, encrypted operation cannot be recovered by any other means). Preferably during "unencrypted" mode operation of a portion of an overall system, each transmitter and receiver upstream of such portion blocks protected content before the protected content can reach any device operating in the unencrypted mode. A repeater should not be able to connect an unencrypted downstream port to an encrypted upstream port under any circumstances, to prevent protected content from ever being transmitted without the necessary encryption but to allow unprotected content (such as error displays or menu selections) to get through.

Unencrypted mode operation, as well as operation in other modes, can be signaled by the above-discussed KSC values as shown in Table 2.

TABLE 2

Key Sequence Code ("KSC") Value Definitions

| Code | Definition |
| --- | --- |
| 0 | Test (non-Encrypted) Operation. Block cipher 222 runs as normal, but the data is not modified by XOR circuitry 223. This can be used to display clear data, and is preferably the reset state. Typically this is a test function, and can only be selected at reset (in which case $K_L$ will be set to 0) or by a valid key message (in which case $K_L$ can be set to anything). |
| 1 . . . 1 | Unencrypted Operation. Block cipher 222 does not run (to reduce power consumption) and the data is not modified by XOR circuitry 223. The KSC is set to this value under the following conditions:<br>Intentionally, within a valid key message, or by purposefully emptying the key input buffers.<br>Whenever a key value has been used, or when the corresponding key register is empty.<br>Whenever a key message decode operation fails. |
| Otherwise | Encrypted Operation. Key is present and valid. |

We next consider the normal operating mode (encrypted operation) of systems having the FIG. 8 architecture (or a variation on such architecture), in which path 123 is implemented as a TMDS-like link, and a transmitter-receiver pair requires authorization (in the form of a "ticket" including a key value) from the content authority before transmitter can transmit encrypted data over the TMDS-like link to the receiver and the receiver can decrypt the transmitted data. In some such embodiments (in which the transmitter employs AES-128 CTR encryption and its counter circuitry generates count values of the type described with reference to Table 1), the transmitter does not need to wait for a new ticket to begin to transmit encrypted data, and can instead begin to transmit encrypted data using a previously received ticket together with a count value including a new randomizer value (i.e., a randomizer value that is different, or has an excellent chance of being different, from the randomizer value last employed to encrypt data using the previously received ticket).

We consider the following phases of encrypted operation of this class of embodiments of the invention: key exchange; authentication (also referred to as challenge-response); revocation; synchronization; link integrity verification; and mode (channel) changes.

To implement the key exchange phase, devices (e.g., displays) that merely receive and decrypt data and do not transmit encrypted data, and repeaters, can be implemented as relatively dumb devices that do not know or understand the details of the key exchange process. In preferred implementations, they merely receive the appropriate key (and any necessary synchronization signals) and begin to decrypt received data using the received key (and any necessary synchronization signals).

In preferred implementations, the transmitter is responsible for implementing a key exchange in which the transmitter receives the keys from the content authority, caches them as necessary, and then distributes them at the appropriate time. The rules governing this behavior should include certain basic elements:

the transmitter must collect information about the system to include in its ticket requests to the content authority. This information can include identification values, capabilities, and current modes for all devices to receive keys;

the transmitter cannot decode the keys meant for any other device in the system, but it can read the KSC value associated with each of the keys. The transmitter can use the KSC values to distribute the keys and verify that they are properly in place, before they are switched into use;

the transmitter can request a block of related keys (from the content authority) for all devices in the system tree, or all devices that might be in the tree in the conceivable future. For example, if the transmitter knows that it is sometimes connected to a particular video projector, it can request a key for that projector even if it is not currently attached. This reduces or eliminates the need to request new tickets when there is a configuration change, and is especially useful when there are switches and repeaters in the system;

the transmitter can request a set of generic keys for use at times when other key sets are not available, or when there might be a significant delay in obtaining them. For example, previously requested generic keys could be used at system boot time.

Preferably, each transmitter keeps track of the repeaters and decrypting displays that have been included in a system with the transmitter, by storing identification values of the repeaters and displays. A caching algorithm can be used to make room for a new device in the identification list if a maximum list size has been exceeded.

In preferred embodiments, after keys have been distributed to a transmitter-receiver pair, the transmitter and receiver execute an authentication procedure (sometimes referred to herein as a "challenge-response" procedure) before the transmitter transmits encrypted data to the receiver. This procedure is useful to prevent replay attacks, and transmission (to the receiver) of key data provided by an invalid or unauthorized source. The challenge-response procedure requires that, before a new key (a $K_L$ value that has been supplied to the receiver, and should also have been supplied to the transmitter) can be used, the receiver (which is typically a repeater or decrypting display) must validate the transmitter by verifying that the transmitter has proper knowledge of this new key. Receiver 115 of FIG. 13 is configured to implement a challenge-response procedure, and includes challenge-response circuitry 144A for use in doing so. We will describe the challenge-response procedure with reference to receiver 115 of FIG. 13 (with delivery path 123 between units 114 and 115 implemented as a TMDS-like link that includes a communication channel for the authentication message, result, and optional additional data to be described) although the challenge-response procedure can also be implemented in accordance with the invention by other types of receivers and transmitters with an appropriate communication channel between each transmitter-receiver pair (the communication channel can be included within, or separate from, the encrypted data transmission link between the transmitter and receiver). Circuitry 144A of receiver 115 generates a pseudo-random number and encrypts this pseudo-random number using cipher 144 and the $K_L$ value to form an authentication message. Receiver 115 sends the authentication message to a transmitter over the above-noted communication channel between the transmitter and receiver. In response, the transmitter's cipher engine decrypts the message, performs a predetermined mathematical function (known to the transmitter and receiver) on the decrypted message to generate a result, and encrypts the result. The transmitter then sends the encrypted result (preferably with a specific value of a randomizer field of the type described with reference to Table 1) back to the receiver over the communication channel. Optionally, the transmitter sends other key material (or other additional data) with the result (the key material or other additional data can be encrypted with the result and sent as part of the encrypted result), and the receiver is configured to operate in response to the key material or other additional data upon successful completion of the challenge-response operation. The additional data may or may not be determined by any other signal processed during the challenge-response operation, and it may (but need not) come from the original content provider or from a unique source inside the transmitter.

The receiver decrypts the encrypted result from the transmitter (using cipher engine 144), and verifies whether the decrypted result satisfies a predetermined criterion (using challenge-response circuitry 144A), preferably thereby determining whether the receiver key has a predetermined relation with the transmitter key. If the decrypted result does satisfy the predetermined criterion, the randomizer field value (or other additional data transmitted with the encrypted result) is stored for use (e.g., by cipher engine 144 in decrypting data from the transmitter) at the proper time. If the decrypted result does not satisfy the predetermined criterion, the new key (the $K_L$ value most recently supplied to the receiver) is treated as being invalid. For example, when the new key has been sent to the receiver in encrypted form by the content authority, and the decrypted result does not satisfy the predetermined criterion, the receiver indicates to the transmitter that the key decoding sequence has failed so that both the receiver and transmitter know that the receiver will not use the new key.

In preferred implementations of the described example of the challenge-response procedure, each of the messages transmitted between the transmitter and receiver contains a pseudo-random value than cannot be known or predicted by the other side unless the encryption and decryption operations work properly using a shared key (the new key) known to both the transmitter and receiver. The procedure thus provides proof that each side knows the correct shared key, and it also prevents "known plaintext" attacks by outside agents.

Another aspect of encrypted operation is revocation of a device's authorization to receive tickets (the device can be a transmitter, receiver, or router). In typical implementations of the inventive system, the content authority examines each device identification value included in a ticket request, and the content authority decides (at its discretion) whether or not to grant the ticket request if any of the identification values in the request are suspect. In some implementations, if the content authority determines that a transmitter is valid but that a receiver requesting encrypted content from the transmitter has an identification value on a revocation list (or does not have a valid identification value), the content authority rejects the request. Optionally, the content authority also instructs the transmitter to include the relevant receiver identification value in a revocation list cached in the transmitter, although in many contemplated implementations the transmitter will not maintain a revocation list. The "suspect" device (the device having the suspect identification value) may not be in the current configuration coupled to the transmitter, or may be otherwise expendable. If it is expendable, and the transmitter has forwarded the ticket request to the content authority on behalf of multiple devices (including the suspect device), the transmitter may choose to remove the suspect device's identification value from the ticket request and resubmit the modified request. The content authority may grant the modified request, but is not required to do so. In any case, the suspect device will not be able to receive or view the protected content because it will not receive the necessary key material.

Other aspects of encrypted operation are key distribution, and synchronization of encryption and decryption operations on both sides of a link. In preferred implementations, the transmitter implements the following process for getting and distributing keys:

the transmitter makes a list of all identification values of devices in the current tree (of which the transmitter is the root), and of any other devices that may be in such a tree in the near future;

the transmitter includes this list in a ticket request that it sends to the content authority;

if and when the transmitter receives the requested tickets, it will distribute them to the relevant devices. Each ticket must go to a specific device, and only that device will be able to decode it;

the transmitter will allow each device sufficient time to decode the tickets. The time spent here is not a bottleneck and does not delay playing protected content, except in the case that it is the first ticket sent to a device. In every other case, the previous ticket can continue to be used until the new ticket is delivered;

each repeater and decrypting display (in the tree) that receives a ticket performs a challenge-response operation (of the type described above) to authenticate the transmitter. As a result of this operation, the transmitter distributes an initial randomizer value to each repeater and decrypting display;

the transmitter then examines the KSC values (key sequence codes) received in the challenge-response operations to verify that all tickets have been delivered and decoded properly, and that each challenge-response sequence has been completed successfully. If this is true for all of the repeaters and decrypting displays, authentication is complete;

when satisfied that authentication is complete, the transmitter issues the appropriate code (e.g., the above-described sequence of CTL3 values) to switch the new key into use;

when necessary and appropriate, the transmitter can issue two successive key switch codes, without authenticating or delivering new key material, to empty the current key and next key registers in the repeaters and decrypting displays. When this occurs, the transmitter should synchronously cease to encrypt data, and should not transmit protected content when it has ceased to encrypt data.

Another aspect of encrypted operation is link integrity verification. The above-described OFB operation is performed by each device in the relevant tree, to generate a 32-bit link integrity value which is loaded into a register (e.g., SyncVal register 228 of FIG. 9) of the device once every 256 frames. When such link integrity values have been loaded into the registers, the transmitter preferably checks its own link integrity value with the corresponding values in all repeaters and decrypting displays.

If a difference is detected between any two such link integrity values, the transmitter construes this to indicate that the relevant cipher state machines are no longer synchronized, and that the link is not operating properly. Under these conditions, the transmitter preferably initiates a recovery procedure in which it either attempts to re-deliver the current keys, requests and delivers new keys, or blocks protected content and enters an unencrypted mode of operation.

Optionally, link integrity verification is performed for some but not all devices of a tree. Also optionally, where a system implements at least two content protection protocols, link integrity verification is performed independently for each of at least two different subsets of the devices (each of the subsets implementing a different one of the protocols). For example, in a system including a transmitter, a player coupled to the transmitter, and a decrypting display coupled to the player (where the transmitter transmits data encrypted in accordance with a first protocol, the player is configured to decrypt data from the transmitter using the first protocol and to transmit data encrypted in accordance with a second protocol, and the decrypting display is configured to decrypt data from the player using the second protocol), the transmitter and player can perform link integrity verification using link integrity values generated in accordance with the first protocol, and the player and decrypting display can independently perform link integrity verification using link integrity values generated in accordance with the second protocol.

Other aspects of encrypted operation are mode ("channel") changes. The normal usage scenarios for a video interface include disruptive events such as channel changes, pause or slow motion or fast forward operations, changes in the system configuration, and so on. Any content protection mechanism must be capable of either surviving these events or recovering quickly, because otherwise it becomes burdensome to the user.

Embodiments of the invention having the FIG. 8 architecture (or a variation on such architecture), in which path 123 is implemented as a TMDS-like link, and a transmitter-receiver pair requires authorization (in the form of a "ticket" including a key value) from the content authority before transmitter can transmit encrypted data over the TMDS-like link, preferably include a number of mechanisms to facilitate this. For example, the transmitter can keep a set of "generic" keys designed for rapid deployment following a mode change (or when communication with another device is initiated, e.g., at boot time), until a new and proper set of keys can be obtained from the content authority. For another example, the transmitter can be capable of unencrypted operation, which can be used to transmit unencrypted data, such as data determining on-screen menus and channel guides (possibly with "teaser" modes or Picture-in-Picture insets).

In preferred embodiments, the inventive system is configured to maintain some of the described values as secrets. Other values can be public. For example, the described OFB field stored in counter circuitry (such as counter circuitry 221 of FIG. 9) of a transmitter or receiver preferably remains secret, to prevent losing too much security when the reduced-round approach is implemented. Preferably also, the randomizer field stored in the counter circuitry remains secret, though it is typically less critical to maintain this value (in contrast with the OFB field) in secret. The frame, line, and pixel fields stored in the counter circuitry need not be secret, and in fact provide useful information to other devices.

The negotiation for capabilities and modes need not be performed in secret, but it should be designed to prevent interference from the outside. This prevents spoofing, or lying, to obtain a ticket that a hacker should not have.

Preferably, a transmitter, receiver, or system configured to implement a content protection protocol in accordance with the present invention is configured to implement more than one (and preferably as many as practical) of the features disclosed herein. The described embodiments are, in general, not exclusive, and in some applications the best performance will be achieved when using some combination of these approaches.

It should be understood that while certain forms of the present invention are illustrated and described herein, the invention is defined by the claims and is not to be limited to the specific embodiments described and shown. For example, although some of the specific embodiments are described herein as being methods or apparatus for encrypting video data, variations on these embodiments are contemplated in which audio data (or other data) rather than video data are encrypted.

What is claimed is:

1. A repeater configured to implement a content protection protocol, for use in a communication system including a transmitter, an external agent configured to be coupled to the repeater and the transmitter, at least one transition minimized differential signaling-like ("TMDS-like") link coupled to the transmitter, a second TMDS-like link, and a receiver coupled to the second TMDS-like link and configured to receive re-encrypted data transmitted over the second TMDS-like link and to decrypt the re-encrypted data, wherein the transmitter is configured to implement the content protection protocol and is operable in an encryption mode to generate encrypted data using a secret value and transmit the encrypted data over the at least one TMDS-like link, the external agent is configured to respond to a ticket request by determining or obtaining a determination as to whether to grant the request, and to send signals to the transmitter and the repeater when coupled thereto in response to each granted ticket request to enable the transmitter and the repeater to operate respectively in the encryption mode and a decryption mode, wherein the signals include at least one of the secret value, an encrypted version of the secret value, and data enabling the transmitter and the repeater to obtain the secret value, and wherein the repeater includes:

first circuitry configured to be coupled to at least one said TMDS-like link to receive the encrypted data from the transmitter and configured to operate in the decryption mode in response to at least one of the signals sent by the external agent in response to said granted ticket request to generate decrypted data by decrypting the encrypted data using the secret value and to generate translated data by processing the decrypted data; and second circuitry coupled to the first circuitry and configured to be coupled to the second TMDS-like link, wherein the second circuitry is configured to generate re-encrypted data by encrypting the translated data, and to transmit the re-encrypted data over the second TMDS-like link when coupled to said second TMDS-like link, wherein the repeater is configured to send the ticket request to the external agent when the repeater is coupled to said external agent.

2. The repeater of claim 1, wherein the system also includes a switch, wherein the at least one TMDS-like link includes a first TMDS-like link coupled between the transmitter and the switch, a third TMDS-like link coupled to the switch, and a fourth TMDS-like link, wherein the switch is coupled to receive the encrypted data from the transmitter and to assert the encrypted data over a selected one of the fourth TMDS-like link and the third TMDS-like link, and the first circuitry is configured to be coupled to the third TMDS-like link.

3. A receiver configured to implement a content protection protocol, for use in a communication system also including a transmitter configured to implement the content protection protocol, a transition minimized differential signaling-like ("TMDS-like") link coupled to the transmitter, and a communication channel coupled to the transmitter, wherein the content protection protocol includes a procedure for supplying a receiver key to the receiver and a challenge-response procedure for verifying whether the transmitter has a transmitter key matching the receiver key, and the transmitter is configured to perform a predetermined mathematical function on an authentication message received over the channel to generate a result, to encrypt the result using the transmitter key to generate an encrypted result, and to send the encrypted result over the channel, and wherein the receiver includes:

circuitry, configured to be coupled to the communication channel and to encrypt first data in accordance with the protocol using the receiver key to generate an authentication message, to send the authentication message to the transmitter over the channel when coupled to said channel, to generate a decrypted result by decrypting said encrypted result using the receiver key, and to determine whether the decrypted result satisfies a predetermined criterion, wherein the receiver is configured to be coupled to the TMDS-like link, the protocol is a symmetric block protocol in which the transmitter sends encrypted data over the TMDS-like link to the receiver when the receiver is coupled to said TMDS-like link and the receiver decrypts the encrypted data in response to the receiver key and a sequence of count values, wherein the transmitter is configured to generate a pseudo-random value, the transmitter is configured to transmit the pseudo-random value over one of the communication channel and the TMDS-like link to the receiver, and the receiver is configured to include the pseudo-random value as a field of at least one of the count values upon determining that the decrypted result satisfies the predetermined criterion.

4. The receiver of claim 3, wherein the communication channel is a channel of the TMDS-like link, and wherein the transmitter is configured to transmit the pseudo-random value and the encrypted result over said channel of the TMDS-like link to the receiver when the receiver is coupled to said TMDS-like link.

5. A transmitter configured to implement a content protection protocol, for use in a communication system also including a receiver configured to implement the content protection protocol, a transition minimized differential signaling-like ("TMDS-like") link coupled to the receiver, and a communication channel coupled to the receiver, wherein the content protection protocol includes a procedure for supplying a receiver key to the receiver and a challenge-response procedure for verifying whether the transmitter has a transmitter key matching the receiver key, and the receiver is configured to encrypt first data in accordance with the protocol using the receiver key to generate an authentication message, to send the authentication message over the channel, to generate a decrypted result by decrypting an encrypted result received over the channel using the receiver key, and to determine whether the decrypted result satisfies a predetermined criterion, and wherein the transmitter includes:

circuitry, configured to be coupled to the communication channel and to perform a predetermined mathematical function on said authentication message received over the channel to generate a result, to encrypt the result using the transmitter key to generate an encrypted result, and to send the encrypted result to the receiver over the channel when coupled to said channel, wherein the transmitter is configured to be coupled to the TMDS-like link, the protocol is a symmetric block protocol in accordance with which the receiver decrypts encrypted data received over the TMDS-like link in response to the receiver key and a sequence of count values, the transmitter is configured to send the encrypted data over the TMDS-like link to the receiver when coupled to said TMDS-like link, the transmitter is configured to generate a pseudo-random value and to transmit the pseudo-random value over one of the communication channel and the TMDS-like link to the receiver when coupled to the communication channel and the TMDS-like link, and the receiver is configured to include the pseudo-random value as a field of at least one of the count values upon determining that the decrypted result satisfies the predetermined criterion.

6. The transmitter of claim 5, wherein the communication channel is a channel of the TMDS-like link, and the transmitter is configured to transmit the pseudo-random value and the encrypted result over said channel of the TMDS-like link to the receiver when coupled to said TMDS-like link.

* * * * *